United States Patent
Hamabe et al.

(10) Patent No.: US 8,565,753 B2
(45) Date of Patent: Oct. 22, 2013

(54) RADIO COMMUNICATION SYSTEM, METHOD AND PROGRAM

(75) Inventors: Kojiro Hamabe, Tokyo (JP); Jinsock Lee, Tokyo (JP)

(73) Assignee: NEC Corporation, Tokyo (JP)

( * ) Notice: Subject to any disclaimer, the term of this patent is extended or adjusted under 35 U.S.C. 154(b) by 136 days.

(21) Appl. No.: 12/741,157

(22) PCT Filed: Nov. 7, 2008

(86) PCT No.: PCT/JP2008/070288
§ 371 (c)(1),
(2), (4) Date: May 3, 2010

(87) PCT Pub. No.: WO2009/060935
PCT Pub. Date: May 14, 2009

(65) Prior Publication Data
US 2010/0267378 A1 Oct. 21, 2010

(30) Foreign Application Priority Data
Nov. 9, 2007 (JP) .................................. 2007-292364

(51) Int. Cl.
*H04W 24/00* (2009.01)
*H04W 36/00* (2009.01)

(52) U.S. Cl.
USPC .......................................... 455/423; 455/436

(58) Field of Classification Search
USPC .................................................. 455/423, 436
See application file for complete search history.

(56) References Cited

U.S. PATENT DOCUMENTS

| 6,978,151 | B2 | 12/2005 | Choi et al. |
| 7,027,816 | B2 | 4/2006 | Kikuma et al. |
| 7,065,351 | B2 | 6/2006 | Carter et al. |
| 2002/0168993 | A1 | 11/2002 | Choi et al. |
| 2004/0029588 | A1* | 2/2004 | Kikuma et al. ............... 455/436 |
| 2004/0097237 | A1 | 5/2004 | Aoyama |
| 2004/0152362 | A1* | 8/2004 | Carter et al. ................. 439/660 |
| 2007/0037584 | A1* | 2/2007 | Um ........................... 455/456.1 |

FOREIGN PATENT DOCUMENTS

| JP | 9-018929 | | 1/1997 |
| JP | 2004-048528 | | 2/2004 |
| JP | 2004-166056 | | 6/2004 |
| JP | 2004-235827 | | 8/2004 |
| JP | 2004235827 | A * | 8/2004 |
| JP | 2004-533762 | | 11/2004 |
| JP | 2005-94228 | | 4/2005 |
| JP | 2005094228 | A * | 7/2005 |
| JP | 2006-516869 | | 7/2006 |
| JP | 2007-127584 | | 5/2007 |

OTHER PUBLICATIONS

JP 2004235827 English translation.*
JP 2005094228 English translation.*

(Continued)

*Primary Examiner* — Jinsong Hu
*Assistant Examiner* — Jean Chang
(74) *Attorney, Agent, or Firm* — Young & Thompson

(57) ABSTRACT

When a mobile terminal experienced a radio link failure in a first cell and establishes a re-connection in a second cell within a predefined time and/or within a preset movement distance from the time of the radio link failure, the mobile terminal reports at least one of the information regarding a first cell and the information regarding a second cell.

35 Claims, 15 Drawing Sheets

(56) References Cited

OTHER PUBLICATIONS

International Search Report, PCT/JP2008/070288, Feb. 10, 2009.
3GPP-TSG-RAN WG2, Orlando, USA Jun. 25-29, 2007, 4.8—Self-optimising networks "UE assistance for self-optimizing of network".
Notice of Ground for Rejection issued by the Japanese Patent Office on Aug. 14, 2012 in counterpart Japanese Patent Application No. 2009-540096 with English translation of portion enclosed in wavy lines, 4 pages.
Japan Office Action, Patent Application No. 2009-540096, dated Dec. 4, 2012.

* cited by examiner

RADIO COMMUNICATION SYSTEM, METHOD AND PROGRAM

CROSS-REFERENCE TO RELATED APPLICATION

1. Technical Field

The present Application claims priority rights based on a Japanese Patent Application No. 2007-292364, filed on Nov. 9, 2007. The total disclosure of the patent application of the senior filing date is to be incorporated herein by reference.

This invention relates to a radio communication system and, more particularly, to a system, a method and a program for controlling the reporting on measurement result obtained by a mobile station.

2. Background Art

Recently, as mobile phones and related services have become diversified, there is raised a demand for reducing the cost for maintenance or adjustment for optimization of the mobile communication system. Among the subjects for maintenance or adjustment for optimization, there are, for example, the transmission power of a base station and an antenna tilt angle thereof. These are referred to as radio parameters (see Patent Document 1).

In general, the maintenance and adjustment of the communication system are carried out based on evaluation researches-that use a radio network design simulator. To improve the simulation accuracy, the information regarding the reception status actually measured in a service area of the radio communication system, and the information regarding a location where measurement were made, are input to the design simulator. In the radio communication system, for example, the CDMA (Code Division Multiple Access) system, a reception quality or a reception strength of a common pilot channel, for example, is used as the information regarding the reception status.

In making measurement of the information regarding the reception status, there has so far been known a method by using a dedicated measurement car or a team of experts in measurement. In addition, there has been known a method in which the information regarding the reception status is measured by a mobile radio terminal, possessed by a general user, and the so measurement result are collected. In a configuration disclosed in Patent Document 1, a mobile radio terminal monitors the status of a radio link of the user communication. The status of the radio link, satisfying a preset condition, are detected as a trigger. When detecting the trigger, the mobile radio terminal acquires the reception status of the radio signal and the terminal's own location. The mobile radio terminal then transmits the reception status and the information regarding the measurement including the own location to a management server (information collecting server). The information collecting server then internally records the actual information regarding the measurement received from the mobile radio terminal.

[Patent Document 1] JP Patent Kokai Publication No. JP-P2004-166056A

[Patent Document 2] JP Patent Kokai Publication No. JP-P2004-046528A

[Patent Document 3] JP Patent Kokai Publication No. JP-P2007-127584A

[Non-Patent Document 1]: "UE assistance for self-optimizing of networks", 3GPP TSG-RAN WG2 R2-072432, 25-29 Jun. 2007

SUMMARY

The disclosures of Patent Document 1 and Non-Patent Document 1 are incorporated herein by reference. The following analysis is given by the present invention.

A system in which a mobile station makes reports via the base station to the management server will now be analyzed in accordance with the description of Patent Document 1. Based on an instruction from the management server, the base station transmits a measurement control notification (period type, event type or on-demand type) to a mobile station. In case of the on-demand type, the mobile station performs measurement on receipt of the measurement control notification. In case of the period type, the mobile station performs measurement at a fixed period.

In case a reporting is to be made with the event type, when an event that meets preset conditions and that is to become a trigger occurs in the link status monitored by the base station, the mobile station reports the occurrence of the event to the base station. The event may be exemplified by a radio link failure, a handover (HO) failure, a lowered throughput and a deteriorated pilot quality.

As the measured result, reported by the mobile station, the reception status, a location thereof and, in case the report is of the event type, the event sort, are transmitted. As the information regarding the reception status and the own location, the pilot reception quality of the common pilot signal of a serving cell (cell currently offering a service) and surrounding cells are used. The temporary mobile station ID (identification), which is an identifier at L3 (RRC), and the time information, may also be included in the report. If, when the mobile station transmits a measurement result of the link status to the base station, communication has become disabled due to on a radio link failure or a base station failure, the report buffered in the mobile station is transmitted to the base station when the link is re-connected to enable the communication. On receipt of reports from the mobile station, the base station transmits the reports to the management server.

The management server collects the report information and re-sets the radio parameters, such as antenna tilt angle.

In connection with the above system analyzed, the present inventors have been informed that the system is beset with the following problems:

If, in a handover of the mobile station, the handover failed due to occurrence of a radio link failure, it is desired that the location of occurrence of the radio link failure is identified to optimize the radio parameters on the location.

There are a case where a radio link failure is unavoidable due to the deteriorated radio link quality, and a case where a radio link failure may be avoided by a handover, such as an inter-frequency handover. It is desirable to distinguish a radio link failure that may be avoided by carrying out such handover from other radio link failure to render it possible to report to e.g., the management server the information that may be useful to optimize the radio parameters for the location where the radio link failure occurs.

On the other hand, the recovery of the unavoidable radio link failure may, after all, not be possible even if the management server or the operator adjusts the radio parameters, based on reports on the radio link failure from the mobile stations. Such reports received from the mobile stations do not contribute to optimizing the radio parameters.

The present inventors conducted perseverant researches into finding a solution to the above problems and, based on the these findings, have invented the present invention. It is an object of the present invention to provide a terminal, a system and a method that allow for optimizing the radio parameters on the location of occurrence of the radio link failure.

The invention may be summarized substantially as follows, though not limited thereto only:

In one aspect of the present invention, there is provided a mobile station characterized in that the mobile terminal, after experiencing a radio link failure followed by a re-connection, performs reporting, in case at least one of
(a) a relation that an elapsed time from the radio link failure until the re-connection is less than or equal to a predetermined preset time length, and
(b) a relation that a movement distance of the mobile terminal during the time period from the radio link failure until the re-connection is less than or equal to a predetermined preset distance value, holds,
cell information of at least one of
(c) a cell where the radio link failure occurred and
(d) a cell where the mobile terminal establishes the re-connection.

Or, there may be provided a mobile station characterized in that the mobile terminal, after experiencing a radio link failure followed by a re-connection, performs reporting, at least one of
(e) the elapsed time from the radio link failure until the re-connection and
(f) the movement distance during the time period from the radio link failure until the re-connection.

According to the present invention, there is also provided a base station that receives a report from a mobile station that, after experiencing a radio link failure followed by a re-connection thereof, performs at least one of reporting, in case at least one of
(a) a relation that an elapsed time from the radio link failure until the re-connection is less than or equal to a predetermined preset time length and
(b) a relation that a movement distance of the mobile terminal during the time period from the radio link failure until the re-connection is less than or equal to a predetermined preset distance value, holds,
cell information of at least one of a cell where the radio link failure occurred and a cell where the mobile terminal establishes the re-connection; and
reporting, at least one of
(c) the elapsed time from the radio link failure until the re-connection and
(d) the movement distance during the time period from the radio link failure until the re-connection.

According to the present invention, there is also provided a management server that receives, via a base station, a report from a mobile station that, after experiencing a radio link failure followed by a re-connection thereof, performs at least one of reporting, in case at least one of
(a) a relation that an elapsed time from the radio link failure until the re-connection is less than or equal to a predetermined preset time length and
(b) a relation that a movement distance of the mobile terminal during the time period from the radio link failure until the re-connection is less than or equal to a predetermined preset distance value, holds,
cell information of at least one of a cell where the radio link failure occurred and a cell where the mobile terminal establishes the re-connection; and
reporting, at least one of
(c) the elapsed time from the radio link failure until the re-connection and
(d) the movement distance during the time period from the radio link failure until the re-connection.

According to the present invention, there is also provided a method for radio communication, comprising:

after a mobile terminal experiencing a radio link failure followed by a re-connection thereof, performing by the mobile terminal, at least one of
(A) reporting, in case at least one of a relation that an elapsed time from the radio link failure until the re-connection is less than or equal to a predetermined preset time length and a relation that a movement distance of the mobile terminal during the time period from the radio link failure until the re-connection is less than or equal to a predetermined preset distance value, holds,
cell information of at least one of a cell where the radio link failure occurred and a cell where the mobile terminal establishes the re-connection; and
(B) reporting, at least one of the elapsed time from the radio link failure until the re-connection and the movement distance during the time period from the radio link failure until the re-connection.

According to the present invention, there is also provided a radio communication system comprising a mobile terminal which, after experiencing a radio link failure followed by a re-connection thereof, performing by the mobile terminal, at least one of
(A) reporting, in case at least one of a relation that an elapsed time from the radio link failure until the re-connection is less than or equal to a predetermined preset time length and a relation that a movement distance of the mobile terminal during the time period from the radio link failure until the re-connection is less than or equal to a predetermined preset distance value, holds,
cell information of at least one of a cell where the radio link failure occurred and a cell where the mobile terminal establishes the re-connection; and
(B) reporting, at least one of the elapsed time from the radio link failure until the re-connection and the movement distance during the time period from the radio link failure until the re-connection.

According to the present invention, there is further provided a program for causing a computer composing a mobile terminal to execute the processing comprising, after experiencing a radio link failure followed by a re-connection thereof, performs at least one of
(A) reporting, in case at least one of a relation that an elapsed time from the radio link failure until the re-connection is less than or equal to a predetermined preset time length and a relation that a movement distance of the mobile terminal during the time period from the radio link failure until the re-connection is less than or equal to a predetermined preset distance value, holds,
cell information of at least one of a cell where the radio link failure occurred and a cell where the mobile terminal establishes the re-connection; and
(B) reporting, at least one of the elapsed time from the radio link failure until the re-connection and the movement distance during the time period from the radio link failure until the re-connection. There is also provided a computer readable recording medium storing the above described program according to the present invention.

According to the present invention, it is possible to determine a location of the radio link failure in a handover.

Still other features and advantages of the present invention will become readily apparent to those skilled in this art from the following detailed description in conjunction with the accompanying drawings wherein only exemplary embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

PREFERRED MODES

The present invention above described will now be described in detail with reference to the drawings. In the following, one of principles of the present invention will be described first and exemplary embodiments thereof will then be described.

Figure 1A:
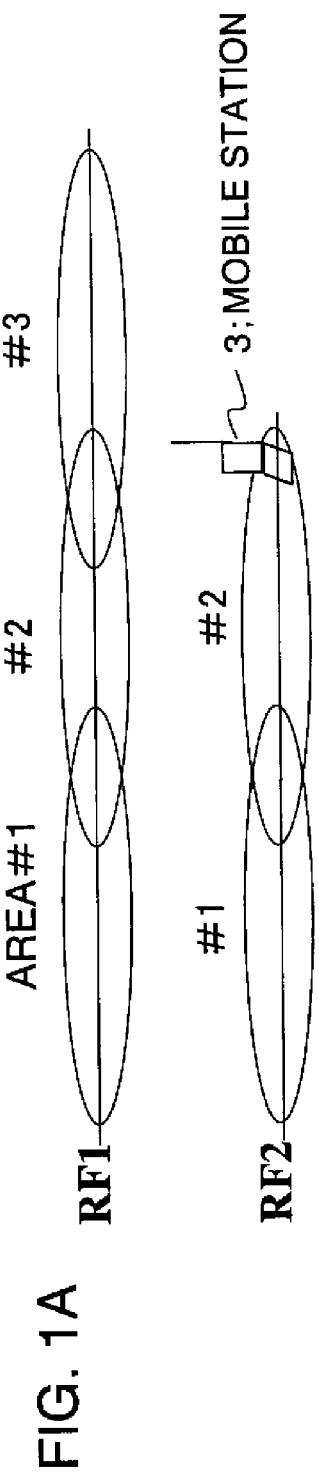
FIGS. 1A and 1B are diagrams illustrating the present invention.

FIG. 1A is a diagram illustrating the operating principle according one mode of the present invention. Referring to FIG. 1A, frequencies (carrier frequencies) RF1 and RF2 are used in an area #1 and in an area #2, respectively, whereas only a frequency RF2 is used in an area #3.

It is supposed that, in a mode of the present invention, when a mobile station (mobile station) 3 is having communication with a base station in the area #2, using a frequency RF2, a radio link failure occurred, and re-connection is made to another radio link of a frequency RF1 within a predefined time period. In this case, the cell information of the cell with the frequency RF1 and that of the cell with the frequency RF2 are reported to the base station, not shown, and reported from the base station to a management server, not shown.

It is supposed that, in a mode of the present invention, radio link failures frequently occur at the frequency RF2, for example. In such case, a threshold value that controls the start of the measurement at the different frequency RF1 which is a destination of the frequency switching is set to a higher value to enable the measurement at RF1 to be started at an earlier timing. The change instruction for changing the measurement start threshold value is notified as contents of a measurement instruction transmitted from the management server to the mobile station via the base station.

In modes of the present invention, control may be exercised as follows:

(A) The base station notifies the mobile station 3 of the measurement start threshold value. If the quality of RF2 has become lower than the threshold value, the mobile station 3 reports that purport to the base station.

(B) On receipt from the mobile station 3 of the report that the quality of RF2 has become lower than the threshold value, the base station 3 instructs the mobile station 3 to start measuring quality of RF1. The mobile station 3 is responsive to the instruction from the base station to start measuring quality of RF1.

(C) When a radio link failure occurs, the management server or the base station changes the quality threshold value (measurement threshold value) to a higher value.

Figure 2A:
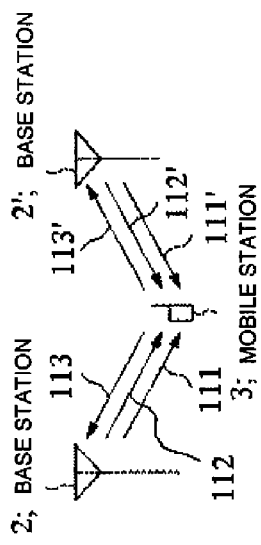
FIGS. 2A to 2C are diagrams illustrating an example of an inter-frequency handover.
Figure 2B:
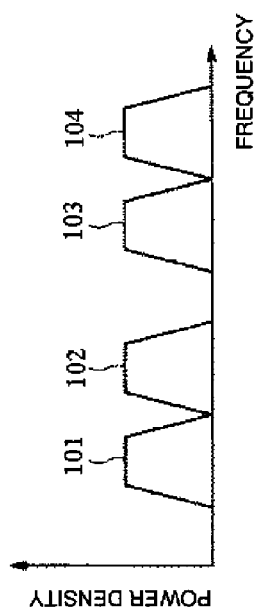
Figure 2C:
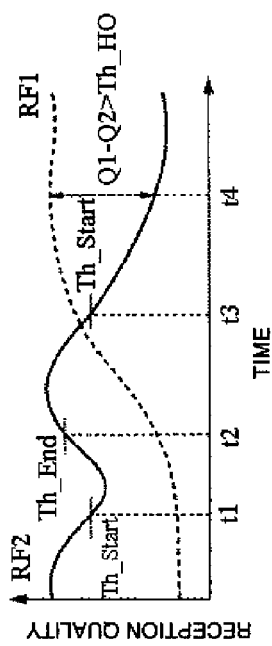

The schema of inter-frequency handover, which is among the features of the present invention, will now be described. In a CDMA cellular system, the same carrier frequency is repeatedly used, and hence there is inherently no necessity for inter-frequency handover in the same system. However, in a cell where a different frequency is allocated, in an umbrella cell, or between different systems, the inter-frequency handover is used. The umbrella cell is such a cell in which a plurality of micro-cells is overlaid on a macro-cell and different carrier frequencies are allocated to the micro-cells. In this inter-frequency handover, the reception levels (power) of the carriers of the different frequencies are measured. The frequency switching control will now be described with reference to FIGS. 2A to 2C. It is noted that FIGS. 2A to 2C are equivalent to FIGS. 8 to 10 of Patent Document 2 filed in the name of the present Assignee. It is also noted that one of the present inventors is among the inventors of Patent Document 2.

Referring to FIG. 2A, the mobile station 3 is having communication with the base station 2 with the frequency RF1, while having communication with the base station 2' with the frequency RF2. In FIG. 2A, 111 and 111' denote downlinks from the base stations 2 and 2' to the mobile stations 3, 113 and 113' denote uplinks from the mobile station 3 to the base stations 2 and 2' and 112 and 112' denote common pilot channels of the down links from the base stations 2 and 2' to the mobile stations 3.

FIG. 2B schematically shows frequency bands of the uplink and the downlink. The carrier frequency (RF1) currently used for the uplink and that currently used for the downlink in the mobile station 3 with the base station 2 are denoted 101 and 103. The frequency (RF2) currently used for the uplink and that currently used for the downlink with the base station 2' of the destination of frequency switching are denoted 102 and 104.

The mobile station 3 measures the reception quality of the common pilot signal of RF2 and the reception quality of the common pilot signal of RF1 to compare them with each other. The mobile station 3 performs inter-frequency switching at a time point (t4 in FIG. 2C), when the difference between the reception quality Q2 of the common pilot signal of RF2 and the reception quality Q1 of the common pilot signal of RF1 is such that $$Q1-Q2 > Th\_HO \text{ [dB]} \tag{1}$$

as a momentum for inter-frequency switching. It is noted that Th_HO is a decision threshold value of frequency switching, and is of a positive value.

It is noted that the inter-frequency switching means switching of the carrier frequency being used. In the present case, the frequency switching in the downlink is the frequency switching from the carrier frequency 103 to the carrier frequency 104 of FIG. 2B, and that in the uplink is the frequency switching from the carrier frequency 101 to the carrier frequency 102 of FIG. 2B. In a cellular system employing a plurality of carriers, it is necessary for a mobile station to have a plurality of reception units (oscillators) for generating a plurality of carrier frequencies. However, from the perspective of reducing the power consumption, a single oscillator may be used, and the oscillation frequencies of the oscillator may be switched as necessary. The reception quality of the carrier of the destination of the frequency switching needs to be measured in such a manner in which transmission timing or reception timing is halted. During the time of measuring the reception quality of the carrier of the destination of the frequency switching, no data from the carrier being in use can be received. The conventional practice has been to perform temporal compression of transmission data during the handover much more as compared with the normal operation to create data void time. For data compression, the coding rate is raised by decreasing the spreading rate or by not transmitting part of coded data. A higher value of the ratio of the data void time (no-transmission time) over the time of communication, which is also termed the data void time ratio, gives rise to the lowered data transmission efficiency and hence is not desirable.

To decrease data void time in the measurement of the different frequency, the mobile station 3 starts measurement of a different frequency (RF1) at a time point (t1 or t3 of FIG. 2C) at which the reception quality Q2 of the common pilot signal of RF2 satisfies $$Q2 < Th\_Start \quad (2)$$

as a momentum. The mobile station then stops measurement of the different frequency (RF1) at a time point (t2 of FIG. 2C) at which the reception quality Q2 of the common pilot signal of RF2 satisfies $$Q2 > Th\_End \quad (3)$$

as a momentum. The mobile station may start frequency switching control (handover control) and simultaneously stop measuring the different frequency, with the time point (t4 of FIG. 2C) that satisfies the relationship (1) as a momentum.

The margins for the decision threshold values Th_Start and Th_End in the inequalities (2) and (3) may be secured so as to satisfy the following inequality:

$$Th\_End - Th\_Start > 0 \ [dB] \quad (4)$$

The inequality (4) means that the larger the difference between Th_End and Th_Start, the larger becomes the margin. By limiting the range of measurement of the different frequency, with the use of Th_End and Th_Start, it is possible to decrease the ratio of the data void time in comparison with the case of not limiting the range of measurement of the different frequency.

In place of performing the frequency switching with the use of the inequality (1), the frequency switching may be performed when the reception quality Q1 of the common pilot signal of the different frequency RF1 of the switching destination has become larger than a preset threshold value. The outline of the inter-frequency procedure is as described in the above.

In a mode of the present invention, the measurement of the different frequency (measurement of the common pilot signal of RF1) is started when the reception quality Q2 of the common pilot signal RF2 currently used has become lower than the measurement start threshold value Th_Start, in accordance with the control shown in FIG. 2C.

In a mode of the present invention, control is exercised so that if radio link failures frequently occur in a handover, the threshold value for different frequency measurement is set to a higher value. This control will now be described with reference to FIG. 1B.

Figure 1B:
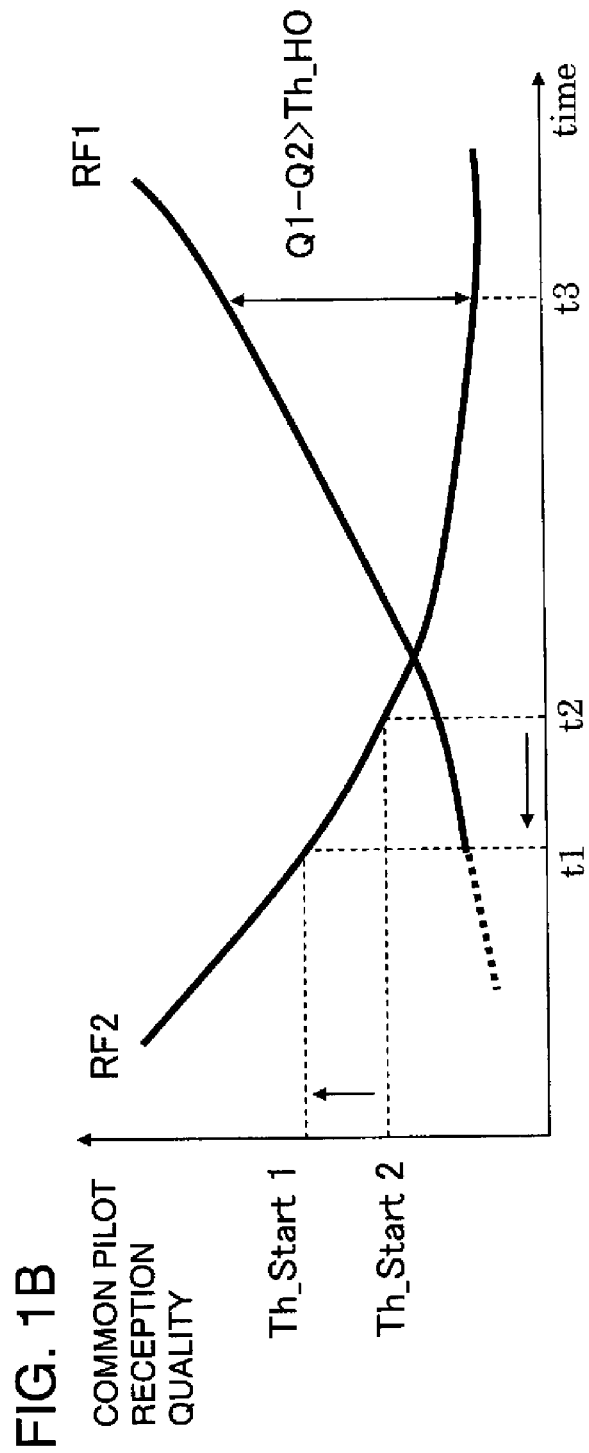

According to a mode of the present invention, if, in FIG. 1B, a normal threshold value of measurement start of the different frequency is set to Th_Start2, a different frequency measurement start threshold value is set to Th_Start1. This change in the measurement start threshold value is notified from a management server, not shown, to the mobile station via the base station.

In a mode of the present invention, in which the measurement start threshold value is re-set to Th_Start1, the time point for starting the measurement of the target frequency RF1 of the inter-frequency handover is brought forward from t2 to t1 (see FIG. 1B).

It is thus possible to report a measurement result at an earlier time point in a handover to the base station to complete the handover. In the present exemplary embodiment, in which the threshold value for starting the measurement in the base station is set to a higher value, the time point of starting the measurement of the target frequency in the handover may be brought forward to facilitate the handover.

The location of occurrence of the radio link disturbance may be identified in case of failure in a handover to render it possible to optimize radio parameters at the location of occurrence of the radio link disturbance.

In a mode of the present invention, switching to a different frequency may be performed at a momentum (t3 in FIG. 1B), when the difference between the reception quality Q1 of the common pilot signal of the target frequency RF1 of the inter-frequency handover and the reception quality Q2 of the common pilot signal of the current frequency RF2 satisfies the relationship (1). Alternatively, the switching to the different frequency may be made in case the reception quality Q1 of the common pilot signal of RF1 exceeds a preset threshold value.

In a mode of the present invention, when the mobile station is re-connected to the different frequency RF1 within a predefined time (and/or within a preset movement distance) from a radio link failure at RF2, the mobile station reports one or both of the cell information of RF2 and the cell information of RF1. The mobile station performs reporting only when the elapsed time from the radio link failure until re-connection is within a predefined time period (or when the movement distance is within a preset range). However, the mobile station performs no reporting when the elapsed time from the radio link failure until re-connection exceeds the predefined time period (or when the movement distance exceeds the preset range). Based on such control, it is possible to suppress reporting not useful for optimizing the radio parameters, and to optimize the radio parameters on the location of occurrence of the radio link failure, while suppressing increase in the radio network traffics due to report transmission.

Alternatively, in a further mode of the present invention, the mobile station may report the elapsed time from occurrence of radio link failure at RF2 until re-connection to RF1.

The mobile station may report the movement distance during the time period from occurrence of radio link failure at RF2 until re-connection to RF1.

In a mode of the present invention, the mobile station may report the elapsed time as well as the movement distance from occurrence of radio link failure at RF2 until re-connection to RF1.

Figure 3:
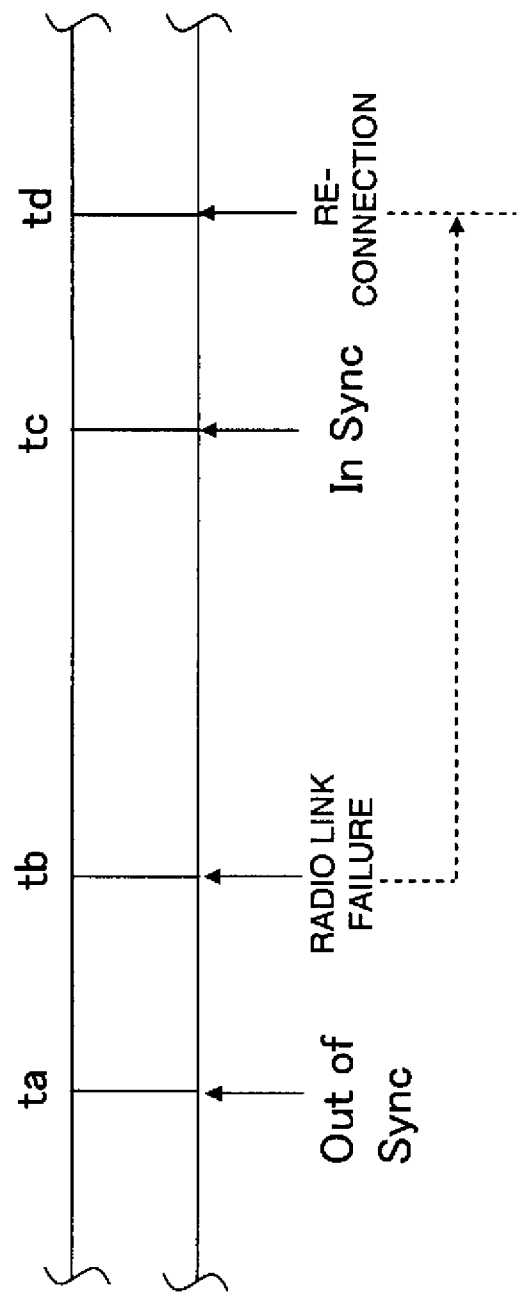
FIG. 3 is a diagram illustrating the time from the radio link failure until re-connection in the present invention.

The time period from the radio link failure until re-connection in the mobile station is to be the time from a time point tb (time of occurrence of radio link failure) until a time point td (radio link setup or re-connection to a network) in FIG. 3. The time period from the radio link failure until re-connection in the mobile station may also be a time from ta (out-of-sync) until td, a time from tb until tc (in-sync) or from ta until td. The exemplary embodiments of the present invention will be described.

Exemplary Embodiments

Figure 4:
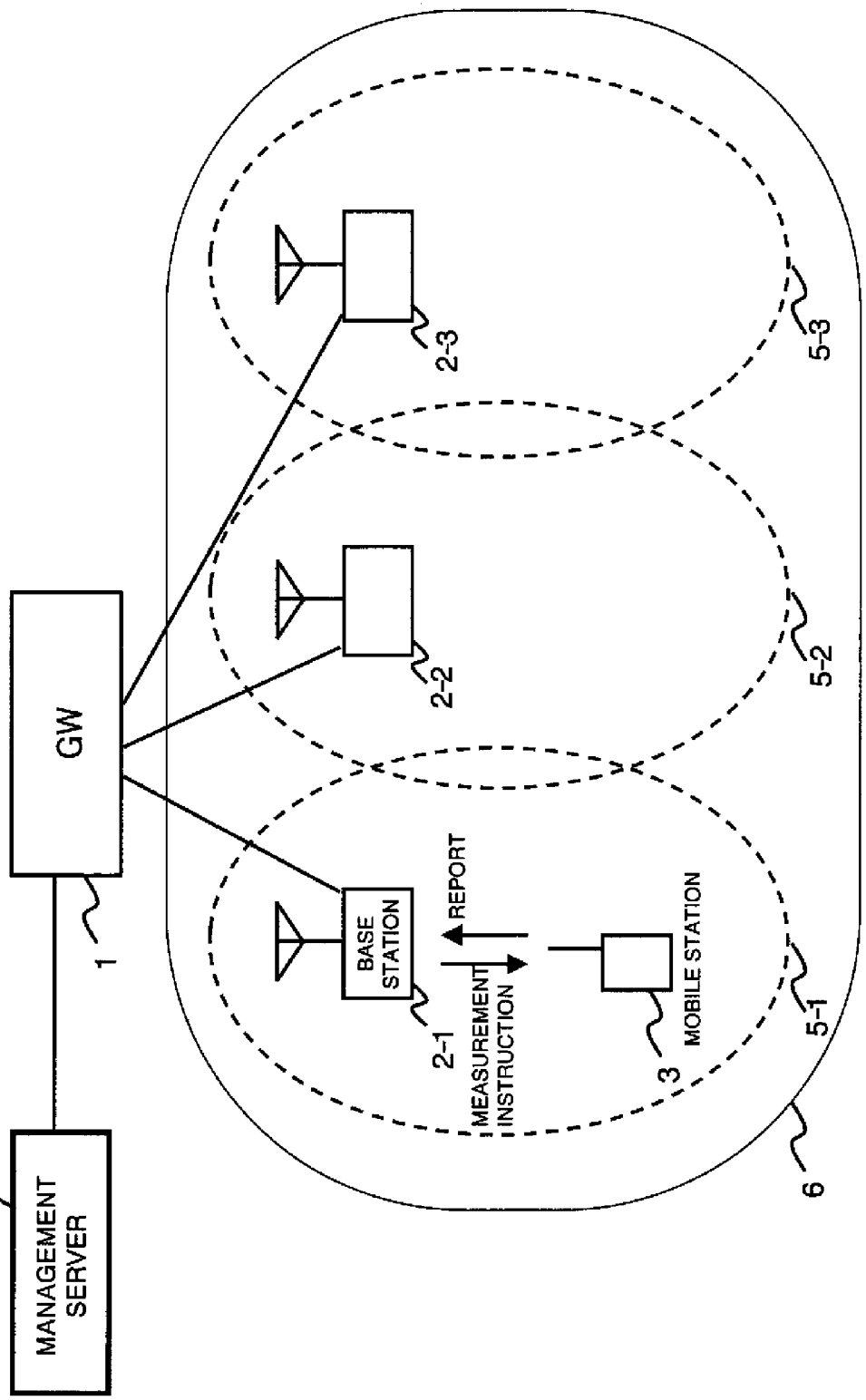
FIG. 4 is a diagram illustrating a system configuration of an exemplary embodiment of the present invention.

FIG. 4 is a diagram showing a configuration of a system according to an exemplary embodiment of the present invention. Referring to FIG. 4, the system of the present exemplary embodiment includes a plurality of base stations (2-1, 2-2 and 2-3), a gateway (GW) 1 which is connected to the base stations, and a management server 4 which is connected to the gateway 1. The base stations (2-1, 2-2 and 2-3) receive a measurement instruction from the management server 4 to notify a plurality of mobile stations, managed thereby, of the fact of receipt of the measurement instruction.

It is supposed that, in an exemplary embodiment of the present invention, a mobile station 3 undergoes a radio link failure in a first cell (for example, 5-1 of FIG. 4), and the mobile station 3 has succeed in re-connection to a second cell (for example, 5-2 of FIG. 4). It is also supposed that such re-connection occurs within a predefined time period from the time of radio link failure or within a preset movement distance from the location of radio link failure. In such case, the mobile station 3 reports at least one of the information regarding the first cell and the information regarding the second cell to the management server 4. From the perspective of suppressing the radio network traffic from increasing as a result of reporting from the multiple mobile stations, the mobile station 3 may not immediately transmit the report for the management server 4 to the base station (2-2) of the second cell to which the mobile station has become re-connected. The mobile station 3 may then save the report in a buffer for transmission at a later time. Or, the mobile station may transmit the report via another base station to the management server 4.

The information regarding the first cell includes the cell ID (cell identification information) of the first cell (5-1) and the reception quality as well as the location information of a pilot signal from the base station 2-1 immediately before the radio link failure. This location information may also be the location information, such as the GPS information of the mobile station 3 at the time point of the radio link failure in the first cell (5-1). Or, the location information may be the location information that identifies the cell in which the mobile station resides when the radio link failure occurs.

The information in the second cell may also include the cell ID of the second cell (5-2) and the reception quality as well as the location information of a pilot signal from the base station 2-2 on the location of the re-connection. This location information may also be the location information, such as the GPS information, of the mobile station 3 on the location of the radio link failure in the second cell (5-2). Or, the location information may be the location information that identifies the cell in which the mobile station was disposed at the time point of the re-connection. It is noted that the information regarding the first and second cells is not limited to this configuration.

Or, the mobile station 3 may count the elapsed time since radio link failure in the first cell (5-1) until re-connection to the second cell (5-2). After the re-connection, the mobile station 3 reports the elapsed time via the base station, such as (2-2), to the management server 4. The mobile station 3 may transmit the elapsed time by including it in the above mentioned report of the information on the first cell and that on the second cell. Or, the mobile station 3 may not immediately transmit the report for the management server 4 to the base station (2-2) to which the mobile station has been re-connected. Instead, the mobile station 3 may store the report in a buffer thereof for transmission later on, or may transmit the report via another base station.

Alternatively, the mobile station 3 may measure the movement distance since the time of radio link failure in the first cell (5-1) until re-connection to the second cell (5-2). After the re-connection, the mobile station reports the movement distance via the base station (e.g., 2-2) to the management server 4. In this case, the mobile station 3 may again not immediately transmit the report to the management server 4 to the base station (2-2) of the second cell the mobile station has been connected to. Instead, the mobile station may store the report in a buffer thereof for transmission later on, or transmit the report via another base station.

Alternatively, the mobile station 3 may also count the elapsed time and measure the movement distance since the radio link failure in the first cell (5-1) until re-connection in the second cell (5-2). After the re-connection, the mobile station may transmit the elapsed time and the movement distance via the base station (e.g., 2-2) to the management server 4. The mobile station 3 may transmit the elapsed time and the movement distance by including them in the above mentioned report regarding the first and second cells. In this case, the mobile station 3 may not immediately transmit the report for the management server 4 to the base station (2-2) to which the mobile station has reconnected. Instead, the mobile station may store the report in a buffer thereof for transmission later on, or transmit the report via another base station.

The base station, mobile station and the management server in the system shown in FIG. 4 will now be described. It is noted that the arrangement as now described is divided into a plurality of blocks by way of function division to assist in understanding. Hence, the present invention is not to be limited to the arrangement as now described.

Figure 5:
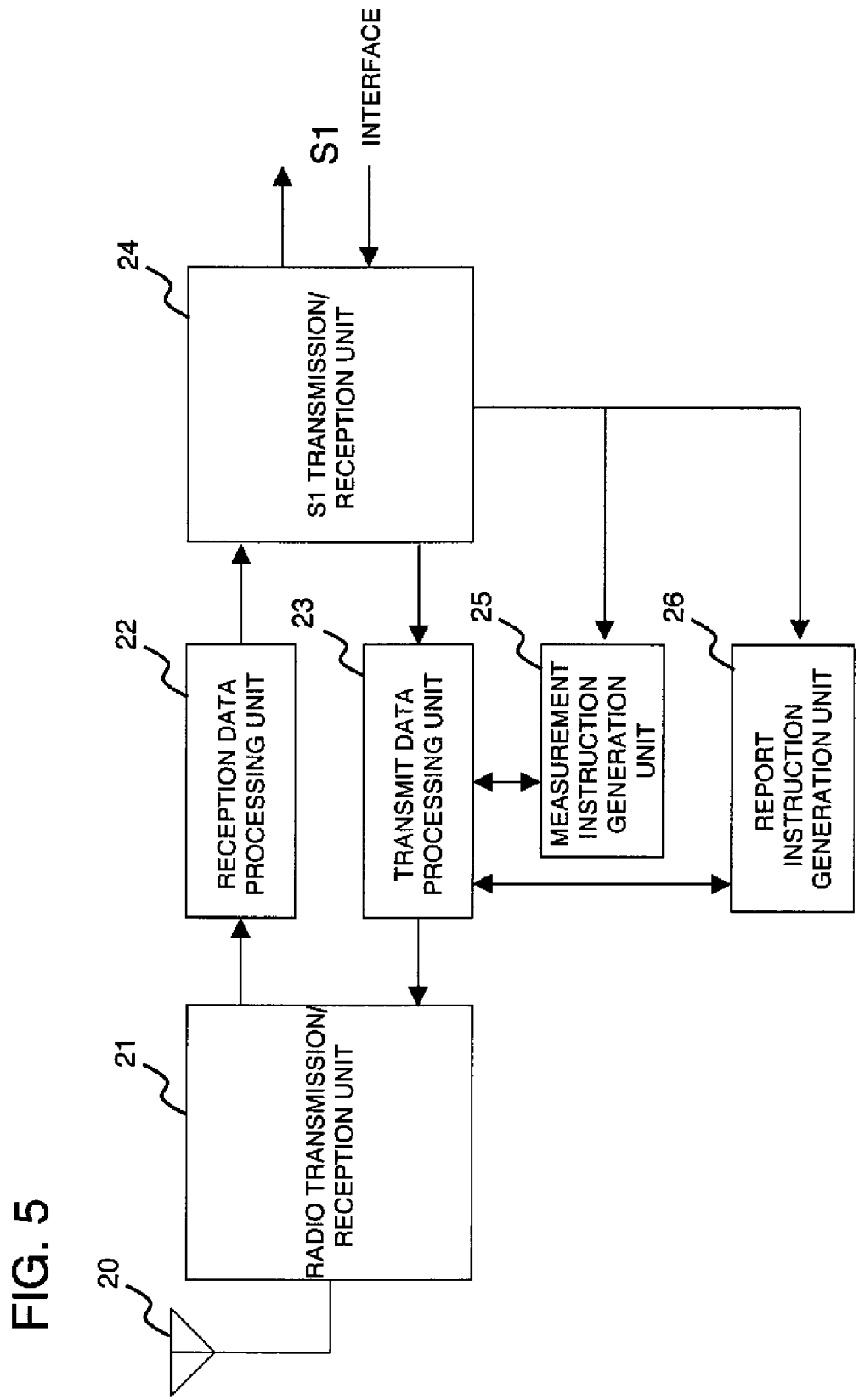
FIG. 5 is a block diagram showing the configuration of a base station according to an exemplary embodiment of the present invention.

FIG. 5 is a diagram showing an example of the configuration of a base station. Referring to FIG. 5, the base station includes an antenna 20, a radio transmission/reception unit 21, a reception data processing unit 22, a transmission data processing unit 23, an S1 transmission/reception unit 24, a measurement instruction generation unit 25 and a report instruction generation unit 26. These component elements generally possess the following functions:

The transmission data processing unit 23 performs error correction and encoding, followed by data modulation, on the transmission data received from the S1 transmission/reception unit 24, and converts the resulting data into an analog signal. In the case of CDMA, the conversion into the analog signal is performed after spectrum spreading with a spreading code. A transmitter, not shown, of the radio transmission/reception unit 21 amplifies the power of an RF signal, obtained on modulation and frequency conversion of transmission data from the transmission data processing unit 23, and transmits the resulting signal via a duplexer, not shown, to the antenna 20. A signal received over the antenna 20 is supplied via the duplexer, not shown, to a reception section, not shown, of the radio transmission/reception unit 21, where the received RF signal is amplified, frequency-converted and demodulated. The resulting signal is supplied to the reception data processing unit 22.

The reception data processing unit 22 converts the reception signal, e.g., the analog signal, into a digital signal, and processes the digital signal with data demodulation, error correction decoding. In the case of the CDMA, the data demodulation, and error correction decoding are performed after reverse spreading and rake synthesis, for example. The reverse spreading is performed with the use of the same spreading code as that of the transmission signal. The reception data processing unit 22 also sends the report information regarding measurement result included in the reception data from the S1 transmission/reception unit 24 via a gateway (1 of FIG. 4) to a management server (4 of FIG. 4).

The measurement instruction generation unit 25 generates a measurement instruction that is to be transmitted to a mobile station. For example, the measurement instruction generation unit 25 generates a measurement instruction for the mobile station, based on an instruction issued from the management server 4, as later described with reference to FIG. 7. The measurement instruction at least includes the cell being measured and items of measurement.

In the present exemplary embodiment, the measurement instruction also includes an instruction for changing a threshold value for starting the inter-frequency measurement in case of inter-frequency handover.

The report instruction generation unit 26 notifies a report instruction of the measurement result via the transmission data processing unit 23 and the radio transmission/reception unit 21 to the mobile station. The report instruction of the measurement result is sent from the management server to the base station, as will be described subsequently.

In the present exemplary embodiment, the report instruction, created by the report instruction generation unit 26 and reported to the mobile station, includes one or more of:

(a1) an instruction for making a report in case, when the mobile station met a radio link failure in the first cell and was re-connected in the second cell, the elapsed time from the radio link failure until re-connection is less than or equal to a preset value;

(a2) an instruction for making a report in case, when the mobile station met a radio link failure in the first cell and was re-connected in the second cell, the movement distance during the time period from the radio link failure until re-connection is less than or equal to a preset value;

(a3) an instruction for making a report in case, when the mobile station met a radio link failure in the first cell and was re-connected in the second cell, the elapsed time from the radio link failure until re-connection is less than or equal to a preset value, with the movement distance being less than or equal to a preset value;

(a4) reporting the elapsed time from the radio link failure until re-connection, in case the mobile station undergoes a radio link failure in the first cell and is re-connected in the second cell;

(a5) reporting the movement distance during the time period from the radio link failure until re-connection in case the mobile station met a radio link failure in the first cell and was re-connected in the second cell; and (a6) reporting the elapsed time and the movement distance during the time period from the radio link failure until re-connection in case the mobile station met a radio link failure in the first cell and was re-connected in the second cell.

Figure 6:
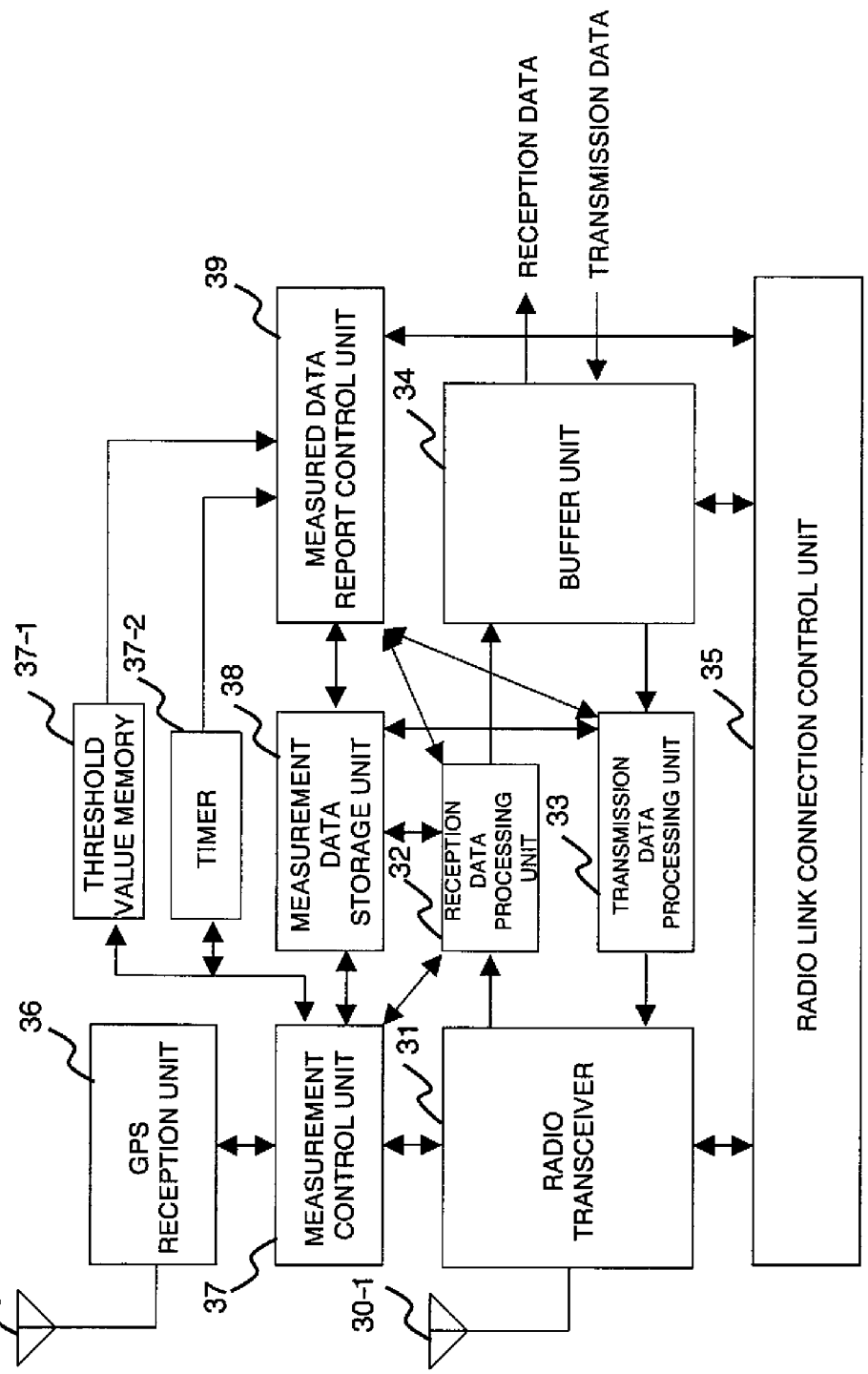
FIG. 6 is a block diagram showing the configuration of a mobile station according to an exemplary embodiment of the present invention.

FIG. 6 is a diagram showing an example of the configuration of the mobile station. Referring to FIG. 6, the mobile station includes a radio transmission/reception unit 31, a reception data processing unit 32, a transmission data processing unit 33, a buffer unit 34, a radio link connection control unit 35, a GPS reception unit 36, a measurement control unit 37, a threshold value memory 37-1, a timer 37-2, a measurement data storage unit 38 and a measurement data report control unit 39. These component elements possess the following functions:

The buffer unit 34 stores the transmission data and the reception data. It is noted that, in FIG. 5, the buffer unit 34 is shown as a single unit only for simplicity of explanation. The buffer unit 34 may, as a matter of course, be separately constructed as a transmission data buffer unit and a reception data buffer unit. The transmission data, stored in the buffer unit 34, is processed by the transmission data processing unit 33 with error correction encoding and data modulation, and subsequently converted into an analog signal. In the case of CDMA, the conversion into the analog signal is to be performed after spectrum spreading with the spreading code. A transmitter section, not shown, of the radio transmission/reception unit 31 processes the transmission data from the transmission data processing unit 33 with modulation and frequency conversion to generate an RF signal. The transmitter section amplifies the power of the RF signal and supplies the resulting power-amplified signal via duplexer, not shown, to an antenna 30-1. A receiver section, not shown, of the radio transmission/reception unit 31 receives the signal from the antenna 30-1, via duplexer, not shown. The receiver section amplifies, frequency-converts and demodulates the received RF signal to supply the resulting demodulated signal to the reception data processing unit 32.

The reception data processing unit 32 converts the reception signal into a digital signal and subsequently processes the resulting digital signal with data demodulation and error correction decoding to store the resulting signal in the buffer unit 34. In the case of the CDMA, the data demodulation, error correction decoding may be carried out only after reverse spectrum spreading followed by rake synthesis, for example. The reverse spectrum spreading is to be performed by the same spreading code as that of the reception signal. The reception data, temporarily stored in the buffer unit 34, is read out so as to be used for respective applications.

The radio link connection control unit 35 exercises control between the mobile station and the base station, such as establishment of radio link connection, re-send control when an error such as time-out occurs, maintaining connection, re-connection trial, disconnection, and handover.

In case the mobile station is capable of having communication with a plurality of radio communication systems, for example, a 3G system and a 2G system, the radio communication system of the radio transmission/reception unit 31, the reception data processing unit 32 and the transmission data processing unit 33 is changed over to the system of the destination of communication under control by the radio link connection control unit 35.

The GPS reception unit 36 receives a signal from the GPS satellite via antenna 30-2 to calculate the location information (longitude, latitude and elevation). In the present exemplary embodiment, the GPS location information, obtained by the GPS reception unit 36 as the location information, is used as the cell information reported from the mobile station to the base station and then to the management server 4. It is noted however that the location information used as the cell information reported from the mobile station to the base station and then to the management server is not limited to the GPS location information. Instead of using the GPS information, the mobile station may detect the location of the mobile station based on the wave propagation time from the base station, the location information regarding the base station, the direction of transmission/reception with respect to the mobile station and so forth. Or, the location information may be detected based on, for example, the phase difference of the electric waves received by the mobile station from the multiple base stations (see e.g., Patent Document 3).

The measurement control unit 37 measures the status of a radio link, such as the reception status, based on the measurement instruction (the measurement instruction is transmitted from the base station) received by the radio transmission/reception unit 31. The measured result is stored in the measurement data storage unit 38. The measured result, the location information regarding the mobile station as obtained by the GPS reception unit 36, the ID information regarding the mobile station (TMSI) and the time information, for example, are stored in a coordinated relationship to one another in the measurement data storage unit 38 in the measurement control unit 37 for later reporting.

Based on the measurement instruction, transmitted from the base station, the measurement control unit 37 measures the reception level (reception quality) of a common pilot signal, or sets the period of measurement.

In a handover, the radio transmission/reception unit 31 receives a common pilot signal of the cell with which the mobile station is currently in communication. The measurement control unit 37 compares the reception level of the common pilot signal with a measurement start threshold value (Th_Start) of the threshold value memory 37-1. If the reception level (reception quality) is not higher than the measurement start threshold value, the reception level of the common pilot signal of a handover target cell begins to be measured. If an instruction for changing the measurement start threshold value has been received from the base station, and the measurement start threshold value of the threshold value memory 37-1 has been changed to Th_Start1, the measurement control unit 37 compares the measurement start threshold value, as changed, with the reception level of the common pilot signal of the cell with which the mobile station is currently in communication, using the as-changed measurement start threshold value Th_Start1.

The measurement control unit 37 periodically measures the reception quality of the common pilot signal of the cell with which the mobile station is currently in communication, and that of the common pilot signal of the target cell.

As mentioned with reference to FIG. 1B, when the difference between the reception quality of the common pilot signal of the target cell and that of the source cell has become equal to or higher than a preset value, the radio link connection control unit 35 switches to the frequency of the target cell.

If a radio link failure occurs after the radio link connection control unit 35 issues a handover request to the base station, the measurement control unit measures the reception level (reception quality) at the handover source and that at the handover destination. The measurement control unit 37 stores the measurement information, inclusive of the type of the event that occurred, the cell ID, measurement result of the pilot signal, the GPS location information and time, in the measurement data storage unit 38.

In the mobile station, the measurement control unit 37 performs measurement based on a measurement instruction from the management server and the base station. The items and the periods of measurement are also set based on an instruction from the base station. Of course, the common pilot signal measured is not limited to the reception level (reception power). For example, the ratio between the power of reception and the interference signal (Ec/Io) may be measured as the reception power quality.

In the threshold value memory 37-1, there are stored various sorts of threshold values, such as measurement start threshold values (TH_Start1, Th_Start2 of FIG. 1B) or Th_HO or Th_End of FIG. 2C. In the threshold value memory 37-1, there is also stored a threshold value (timeout time which is to be set in the timer 37-2) used in determining whether or not the elapsed time from the radio link failure until re-connection in handover is less than or equal to a preset threshold value. The manner of this decision will be described later with reference to FIGS. 9 to 11. There is also stored in the threshold value memory 37-1 a threshold value used in determining whether or not the movement distance since radio link failure until re-connection is less than or equal to a preset threshold value. The manner of this decision will be described later with reference to FIG. 12.

As regards these threshold values, standard values or default values thereof may be held at the outset in the threshold value memory 37-1. Or, the threshold value information may be included in the measurement instruction information or the control information which is transmitted to the mobile station from the base station in which the mobile station has made location registration. In this case, the control information (threshold value information) from the base station, received by the radio transmission/reception unit 31 and the reception data processing unit 32, is stored in the threshold value memory 37-1 via the measurement control unit 37.

The timer 37-2 is used for controlling various timings, such as for managing a measurement period of a radio link status or the timing in controlling the re-connection within a predefined time from a radio link failure by the measurement control unit 37. The timer 37-2 may also be used as a clock for counting the time period from a radio link failure until a re-connection. That is, the measurement control unit 37 may start time count operation of the timer 37-2 on detection by the radio link connection control unit 35 of a radio link failure. On detection of a re-connection of the radio link by the radio link connection control unit 35, the time count operation by the timer 37-2 is halted. The time period thus counted is included by the measurement data report control unit 39 in the contents of the report, and is transmitted wirelessly to the base station from the transmission data processing unit 33 and the radio transmission/reception unit 31. Depending on the length of the timeout time, the timer 37-2 may be arranged as a software timer that performs the count operation by a counter implemented by software technique. The timer 37-2 may have a count operation halted or may have its count value reset by a halt signal (command) or a reset signal (command) from the measurement control unit 37, respectively.

It is supposed that, in case a radio link failure occurred in a handover, such as when a link disconnection occurred after a handover request, a mobile station is re-connected to the handover destination within a predefined time. The measurement data report control unit 39 then receives a notification from the radio link connection control unit 35 and, under control by the radio link connection control unit 35, creates a report inclusive of the information regarding the cell as a handover source and the information regarding the cell as a handover destination. The measurement data report control unit transmits the so created report to the base station. The measurement data report control unit 39 compares a count value of the timer 37-2, which starts time count from the time of radio link failure and which halts time count on re-connection, to a threshold value (time) of the threshold value memory 37-1. If the elapsed time from the radio link failure until the re-connection (count value of the timer 37-2) is less than or equal to the threshold value, the measurement data report control unit 39 creates a report, and transmits the report via the transmission data processing unit 33 and the radio transmission/reception unit 31. If conversely the elapsed time from the radio link failure until re-connection (count value of the timer 37-2) exceeds the threshold value, the measurement data report control unit 39 refrains from creating the report. Hence, no report is sent to the base station.

In reporting the measurement result to the base station, the measurement data report control unit 39 may exercise control of transmitting or inhibiting transmission of a report of the measurement result based on e.g., the status of radio link connection in the radio link connection control unit 35. For example, if the radio link connection control unit 35 has found a radio link failure, the measurement data report control unit 39 may exercise control of not transmitting a report of the measurement result stored in the measurement data storage unit 38 and of transmitting the report at a preset timing at the time of or after re-establishment of connection to the radio link. In order to distribute the concentration of the measurement reports, transmission of the measurement report to the base station may be made stochastically such as by making the measurement report at a preset probability, such as at a probability of 10%.

The transmission data processing unit 33 sends communication data, such as voice data in a call, or a mail. In addition, it receives an instruction from the measurement data report control unit 39, that is, an instruction as to whether reporting of the measurement result is to be made or the reporting is to be inhibited. If the reporting is to be made, the transmission data processing unit 33 reads the cell ID, measurement result of the reception level of the common pilot signal, GPS location information and time, as stored in the measurement data storage unit 38, for example. The transmission data processing unit combines these with the temporary mobile station ID information (TMSI), to create combined data (report), and transmits the report from the radio transmission/reception unit 31. It is noted that at least part of the processing by the measurement control unit 37 and the measurement data report control unit 39 may, of course, be implemented by a program which is being run on a computer that forms the mobile station.

Figure 7:
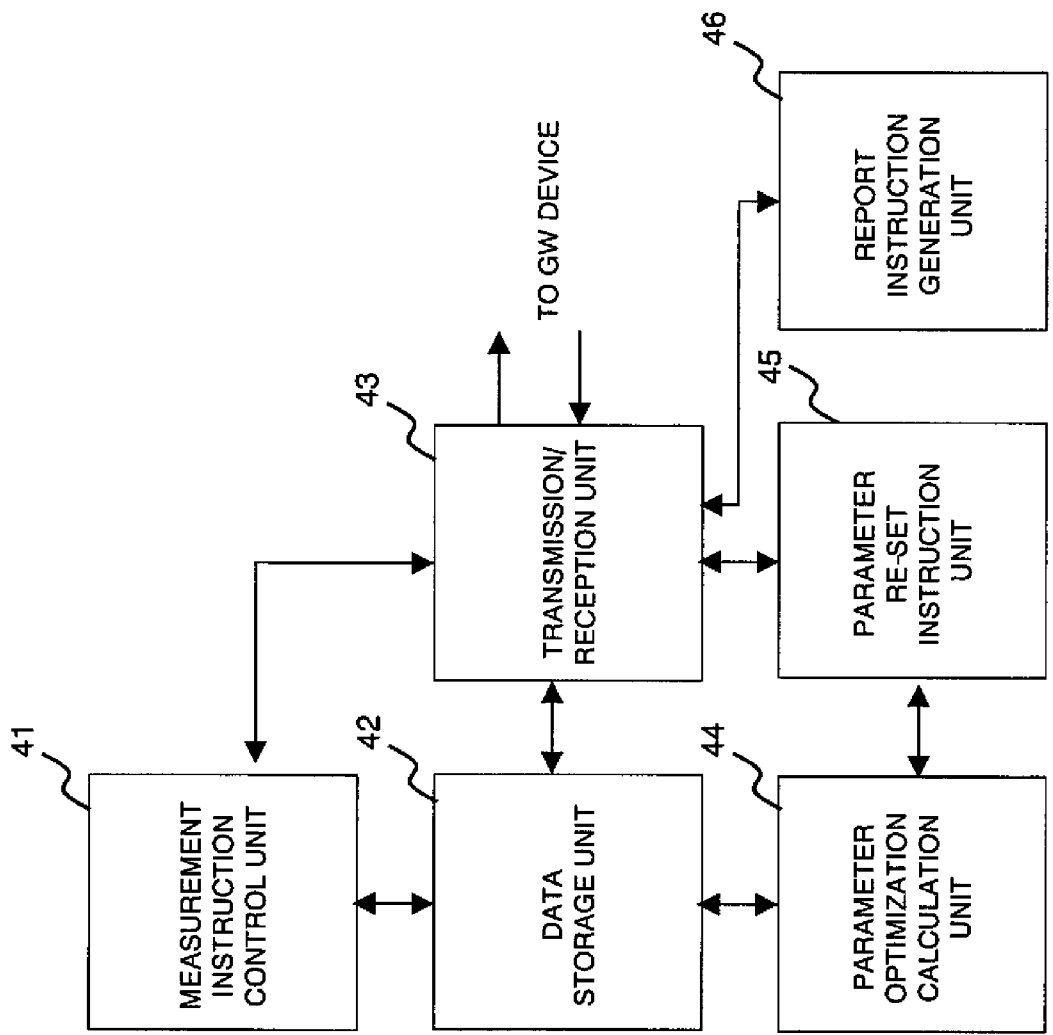
FIG. 7 is a block diagram showing the configuration of a management server according to an exemplary embodiment of the present invention.

FIG. 7 is a diagram an example of the configuration of the management server 4. Referring to FIG. 7, the management server 4 includes a measurement instruction control unit 41, a data storage unit 42, a transmission/reception unit 43, a parameter optimization calculation unit 44, a parameter re-set instruction unit 45 and a report instruction generation unit 46. These respective component units possess substantially the following functions:

The measurement instruction control unit 41 issues a measurement instruction via the base station to the mobile station. The measurement instruction includes an instruction as to whether the measurement is to be performed as a period type, an event type, or as an on-demand type, and items of measurement. It is noted that the types of measurement specified by the measurement instruction, are not limited to the above three types.

In the present exemplary embodiment, the measurement instruction may include an instruction for changing the inter-frequency measurement start threshold value Th_Start at the mobile station, from one base station to another, for example, depending on the status of occurrence of a radio link failure in a cell.

Also, in the present exemplary embodiment, the report instruction generation unit 46 generates instructions for measurement and for reporting by the mobile station. The instruction for reporting may include, for example, (a1) an instruction for making a report in case, when the mobile station met a radio link failure in the first cell and was re-connected in the second cell, the elapsed time from the radio link failure until the re-connection is less than or equal to a preset value;

(a2) an instruction for making a report in case, when the mobile station met radio link failure in the first cell and was re-connected in the second cell, the movement distance during the time period from the radio link failure until re-connection is less than or equal to a preset value;

(a3) an instruction for making a report in case, when the mobile station met radio link failure in the first cell and was re-connected in the second cell, the elapsed time from the radio link failure until re-connection is less than or equal to a preset value, and the movement distance is less than or equal to a preset value;

(a4) an instruction for reporting, in case the mobile station met radio link failure in the first cell and was re-connected in the second cell, the elapsed time from the radio link failure until re-connection;

(a5) an instruction for reporting in case the mobile station met radio link failure in the first cell and was re-connected in the second cell, the movement distance during the time period from the radio link failure until re-connection; and (a6) an instruction for reporting in case the mobile station met radio link failure in the first cell and was re-connected in the second cell, the elapsed time and the movement distance during the time period from the radio link failure until re-connection.

The measurement instruction from the measurement instruction control unit 41 is sent from the transmission/reception unit 43 to the gateway (GW device) (1 of FIG. 4), then sent to the base station and then transmitted to the mobile station in the cell over a radio path.

The transmission/reception unit 43 receives the report information from the base station via the base station and the gateway (GW device) (1 of FIG. 4), and causes the so received report information to be stored in the data storage unit 42.

The parameter optimization calculation unit 44 reads the report information from the data storage unit 42 and performs calculation for optimization on radio parameters, such as antenna tilt angle or power of the relevant base station, based on the report information. If the radio parameters, newly calculated by the parameter optimization calculation unit 44, differ from the radio parameters which have been as already set, the parameter re-set instruction unit 45 sends a parameter re-setting instruction via the gateway (1 of FIG. 4) to the base station. Based on the so received parameter re-setting instruction, the base station sets e.g., the power or the antenna tilt angle.

In the present exemplary embodiment, in case the distance between a location at which the mobile station met a radio link failure and a location at which the mobile station has been re-connected to a network is less than or equal to a preset threshold value, as found using the information regarding the location of the radio link failure in a cell and the information regarding the location of the re-connection in another cell, the parameter optimization calculation unit 44 may set parameters so that a handover between a cell where the mobile station met radio link failure and a cell where the mobile station has been re-connected to the network will be allowed or facilitated.

The allowance of handover will now be described.

(A) The base station holds a list of the identification information regarding the cells, among the cells composing the base station, for which handover is allowed, that is, a list of neighboring cells.

(B) If, in carrying out a handover, the reception level of a first cell is lower than a preset threshold, measurement of the reception quality of each of the neighboring cells, as the reception quality of the second cell, is started.

(C) The allowance of the handover for a cell is by adding the cell into a set of the neighboring cells.

Certain specified exemplary embodiments of a handover will now be described.

<Intra-Frequency Handover>

In the case of the intra-frequency handover (intra-frequency HO), if a radio link failure occurred in a first cell and a re-connection has been established in a second cell that uses the same frequency as that of the first cell, the intra-frequency HO is regarded to be a failure.

With the present exemplary embodiment, it is supposed that, if the elapsed time from the radio link failure until the re-connection is less than or equal to a preset threshold value of time length, and/or the movement distance during the time period from the radio link failure until the re-connection is less than or equal to a preset threshold value of distance. It is also supposed that, in the above case, the radio parameters on the location of occurrence of the radio link failure may be optimized by reporting the information regarding the cell where the radio link failure occurred and that of the cell where the mobile station is reconnected. In such case, the radio are optimized to enable avoiding the failure in the intra-frequency handover, thus allowing the intra-frequency handover.

<Inter-Frequency Handover>

If, in inter-frequency handover, the radio link failure occurred in a first cell and re-connection is made to a second cell that uses a frequency different from that of the first cell, the inter-frequency handover is regarded as being a failure. It is noted that, in case of the inter-frequency handover, the second cell of the handover destination may be in a cell area which is the same as or different from the cell area of the first cell of the handover source.

With the present exemplary embodiment, it is supposed that, in the inter-frequency handover, the elapsed time from the radio link failure until the re-connection is less than or equal to a preset threshold value of time length, and/or the movement distance during the time period from the radio link failure until the re-connection is less than or equal to a preset threshold value of distance. It is also supposed that, in the above case, the radio parameters on the location of occurrence of the radio link failure may be optimized by reporting to the management server the information regarding the frequency (cell) where the radio link failure occurred and the frequency (cell) where the re-connection was made. In such case, the radio parameters are optimized to enable avoiding the failure in the inter-frequency handover, thus allowing the inter-frequency handover. It is further supposed that, if the reception quality of a cell is lower than a preset threshold value, the reception quality of the target frequency of the inter-frequency handover starts to be measured. In such case, the threshold value may be set to a higher value to allow the measurement of the reception quality of the target frequency to be started at an earlier timing to facilitate the handover.

<Inter-System Handover>

Figure 8A:
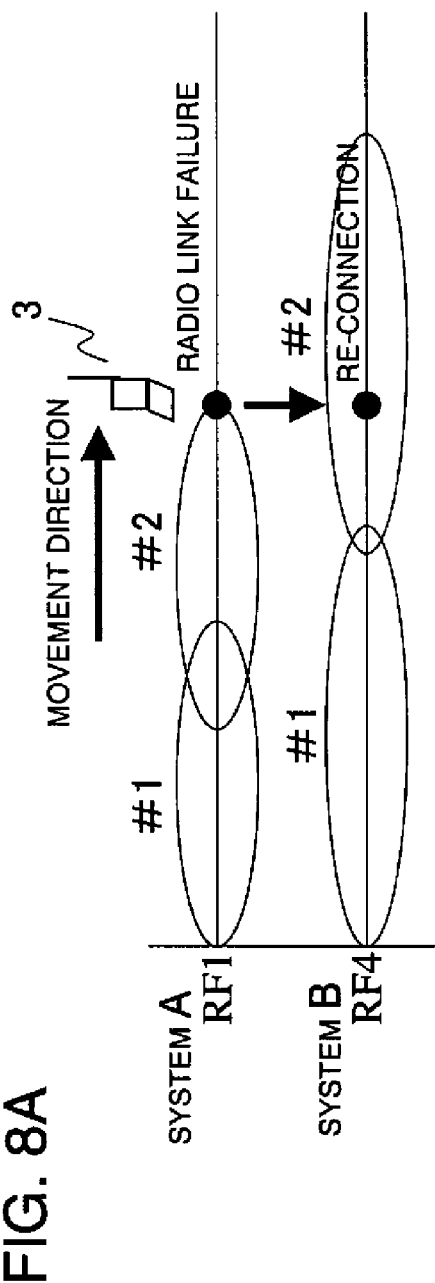
FIGS. 8A and 8B illustrate an inter-system handover according to an exemplary embodiment of the present invention.
Figure 8B:
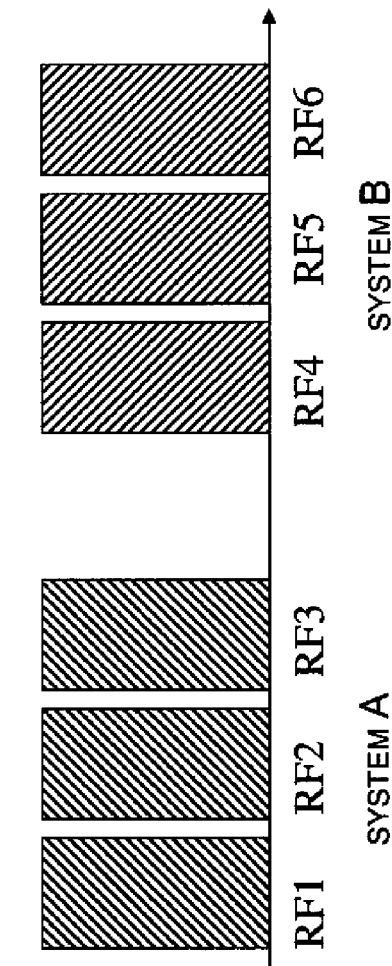

FIG. 8 schematically shows an inter-system handover, also termed an inter-RAT handover. Referring to FIG. 8, it is supposed that, if the mobile station 3, having communication with a system A, moves to en end of a cell #2 of the system A, with a frequency of RF1, where the mobile station undergoes a radio link failure. It is also supposed that the mobile station is re-connected to a cell #2 of a system B with a frequency of RF4. In this case, the inter-system handover is regarded as being a failure. It is noted that the cell of the system B of the handover destination may be in the same cell area as that of the source cell of the system A or may be in a cell area different from that of the source cell of the system A. In a case shown in FIG. 8A, an area covered by the system A differs slightly from the area covered by a relevant cell. The end of the cell #2 of the system A where the mobile station is currently located is facing a mid part of the cell #2 of the system B. Even though the radio link failure occurred at the current location of the cell #2 of the system A, the reception quality at the cell #2 of the system B is satisfactory.

As examples of the system, one out of the systems A and B may be the WCDMA (Wide band Code Division Multiple Access) system (3G system), with the other being the GSM (Global System for Mobile Communications) system. Or, one out of the systems A and B may be the LTE (Long Term Evolution) system, with the other being the WiMAX (Worldwide Interoperability for Microwave Access) system.

With the present exemplary embodiment, it is supposed that, in the inter-system handover, the elapsed time from the radio link failure until the re-connection is less than or equal to a preset threshold value of time length, and/or the movement distance during the time period from the radio link failure until the re-connection is less than or equal to a preset threshold value of distance. It is also supposed that the radio parameters on the location of occurrence of the radio link failure may be optimized by reporting to the management server the information regarding the system where the radio link failure occurred and that regarding the system where the re-connection was made. In such case, the radio parameters may be optimized to enable avoiding the failure in inter-frequency handover, thus allowing the inter-frequency handover. It is also supposed that, if the reception quality of a system is lower than a preset threshold value, measurement of the reception quality of the handover target system is controlled to be started. In such case, the threshold value may be set to a higher value to allow the measurement of the reception quality of the frequency of the target system to be started at an earlier timing to facilitate the handover.

Figure 9:
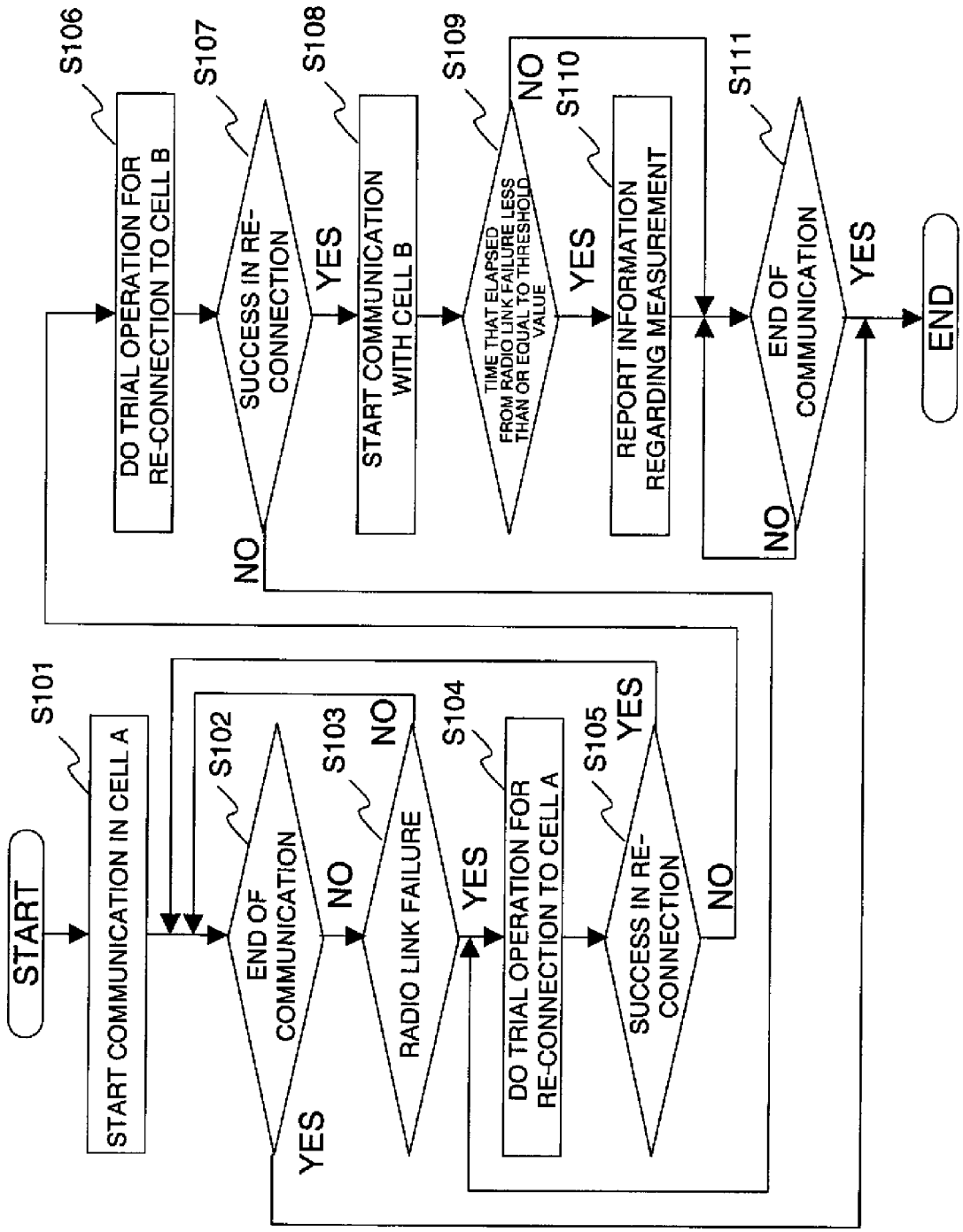
FIG. 9 is a flowchart illustrating the procedure of an exemplary embodiment of the present invention.

FIG. 9 is a flowchart for illustrating the processing procedure of an exemplary embodiment of the present invention. In FIG. 9, there is shown an example of the processing procedure of the above mentioned intra-frequency handover. The processing procedure of the present exemplary embodiment will now be described with reference to FIGS. 6 and 9.

The base station of a cell A of the frequency of the handover source starts communication with the mobile station (step S101). If the communication is a call, data transmission/reception is carried out via the radio transmission/reception unit 31, transmission data processing unit 33, reception data processing unit 32 and the buffer unit 34, between a microphone, not shown, and a loudspeaker, also not shown, of a mobile station shown in FIG. 6.

Before the end of the call (NO of step S102), and on detection of the radio link failure (YES of step S103) by the radio link connection control unit 35 of the mobile station (see FIG. 6), the radio link connection control unit 35 performs a trial operation of re-connection to the cell A (step S104).

If, as a result of the trial operation of re-connection, controlled by the radio link connection control unit 35, the re-connection has been made with success (YES of step S105), processing returns to the step S102 for a call.

If the re-connection has failed (NO of step S105), the radio link connection control unit 35 of the mobile station searches the cell B of the handover destination to perform a trial operation of re-connection to the cell B (step S106). If the radio link connection control unit 35 of the mobile station met success in re-connection (YES of step S107), it starts communication with the base station of the cell B (step S108).

It is supposed that the mobile station met radio link failure and failed in re-connection to the cell A (NO of step S105). If, in this case, the elapsed time from this time point until the time point of re-connection to the cell B (time until YES of step S107) is less than or equal to a preset threshold value (YES of step S109), the measurement data report control unit 39 of the mobile station 3 reports measurement result of the cells A and B stored in the measurement data storage unit 38 (step S110). These measurement result include the cell ID, common pilot signal reception level and the location information. The report at the step S110 is transmitted to the base station of the cell B of the handover destination and then supplied to the management server. Meanwhile, if the radio link failure in the cell A has occurred in e.g., a tunnel, it may sometimes occur that reports from a plurality of mobile stations, re-connected to the cell B, are sent in a congested state. In such case, reporting at the step S110 may not be made immediately at the time instant of re-connection to the cell B. Viz., the reporting may be made with a time delay or may be made via a base station of another cell to the management server 4.

In the present exemplary embodiment, the measurement start time of the cell B of the handover destination may be set at an earlier time point. This may be realized by setting a higher value for the measurement start threshold value, which is compared with the common pilot signal of the cell A of the handover destination, based on the measurement instruction from the base station, as described with reference to FIG. 1B. The measurement control unit 37 of the mobile station 3 stores the reception levels/reception quality of the common pilot signals of the cells A and B and the GPS location information in the measurement data storage unit 38.

If the elapsed time exceeds a preset threshold value (NO of step S109), no report is made of the measurement result of the cell A or B. The communication is continued until the mobile station finishes its call in the cell B (step S111). When, in the radio link connection control unit 35 of the mobile station, the trial operation of re-connection to the cell B fails in the step S107, processing returns to the step S104 to perform the trial operation of re-connection to the cell A.

In FIG. 9, the step S104 of the re-trial operation of re-connection to the cell A, and the step S105 as to whether or not re-connection met success, next following the step S103 of the radio link failure, are only for the sake of illustration. The trial operation of re-connection may be carried out a number of times by the radio link connection control unit 35 of the mobile station. By so doing, it is possible to avoid an error in decision, that is, a mistaken decision of taking a momentary disconnection for a radio link failure. The radio link connection control unit 35 of the mobile station also may treat the time point of decision that the re-connection fails (NO) in the decision step S105 which decides success/failure of the re-connection, as being the time point of the radio link failure, and may count the elapsed time from this time point until success in re-connection (YES of step S107) as being the time from the radio link failure until the re-connection. The same may be said of FIGS. 10, 11, 13 and 14 as later described.

Figure 10:
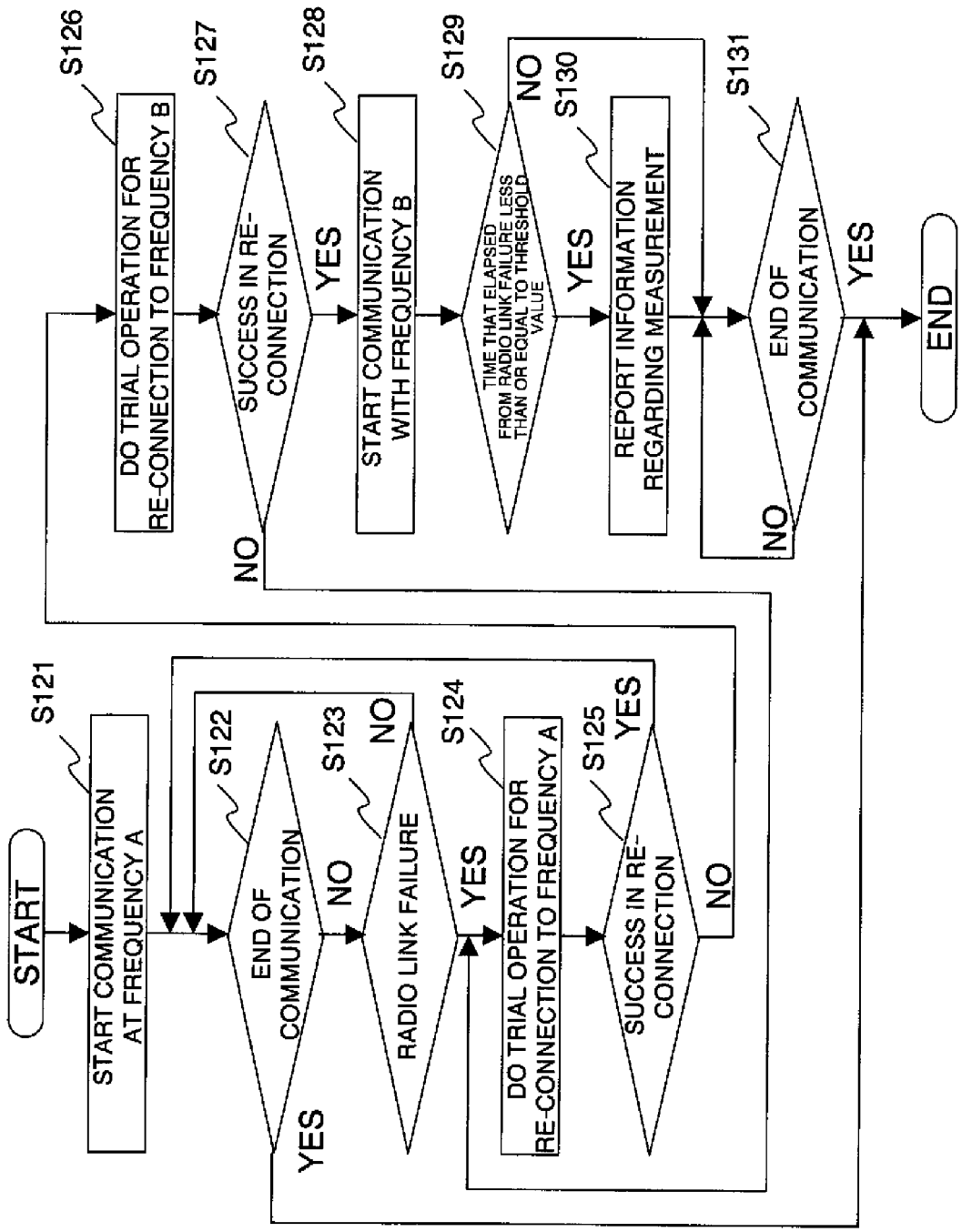
FIG. 10 is a flowchart illustrating the procedure of another exemplary embodiment of the present invention.

FIG. 10 is a flowchart for illustrating the processing procedure of an exemplary embodiment of the present invention. FIG. 10 shows an example procedure of the inter-frequency handover above described. The processing procedure of the present exemplary embodiment will now be described with reference to FIGS. 6 and 10.

The mobile station starts communication with a base station of a frequency A (step S121). If the radio link connection control unit 35 of the mobile station (see FIG. 6) detects a radio link failure (YES of step S123) before the end of the call (NO of step S122), the radio link connection control unit 35 performs a trial operation of re-connection at the frequency A (step S124). If the re-connection succeeds (YES of step S125), a call is made. If the re-connection fails (NO of step S125), a trial operation of re-connection to a base station of a frequency B (step S126) is performed. If the re-connection succeeds (YES of step S127), the radio link connection control unit 35 starts communication with a base station of the frequency B of the handover destination (step S128). If the elapsed time from the time of radio link failure is less than or equal to a preset threshold value (YES of step S129), the measurement data report control unit 39 of the mobile station reports the measurement results of the cells A and B stored in the measurement data storage unit 38 (step S130). These measurement results each include the cell ID, common pilot signal reception level and the location information. The report of the step S130 is transmitted to the base station of the cell B of the handover destination and then sent to the management server. If the radio link failure in the cell A has occurred in e.g., a tunnel, it may sometimes occur that reports from a plurality of mobile stations, re-connected to the cell B, are sent in a congested state. In such case, reporting in the step S130 may not be made immediately at the time instant of re-connection to the cell B. Instead, the reporting may be made with a time delay or may be made via a base station of another cell to the management server. The communication is continued at the mobile station until the call is finished in the cell B (step S131).

In the present exemplary embodiment, the measurement start time of the common pilot signal in the cell B of the handover destination may be set at an earlier time point. This may be realized by setting a higher value for the measurement start threshold value, compared with the common pilot signal of the cell A of the handover destination, at the mobile station, based on the measurement instruction from the base station, as described with reference to FIG. 1B. The measurement control unit 37 of the mobile station 3 measures the reception levels/reception quality of the common pilot signals of the cells A and B, as it changes over the frequencies (carrier frequencies) of the cells A and B, to store the GPS location information in the measurement data storage unit 38.

If the elapsed time from the radio link failure exceeds a preset threshold value (NO of step S129), no reporting is made of the measurement result of the cells A or B. It is noted that, if the radio link connection control unit 35 of the mobile station has failed in the trial operation of re-connection to the cell B in the step S127, it returns to the step S124 to perform a re-trial operation of re-connection to the cell A.

Figure 11:
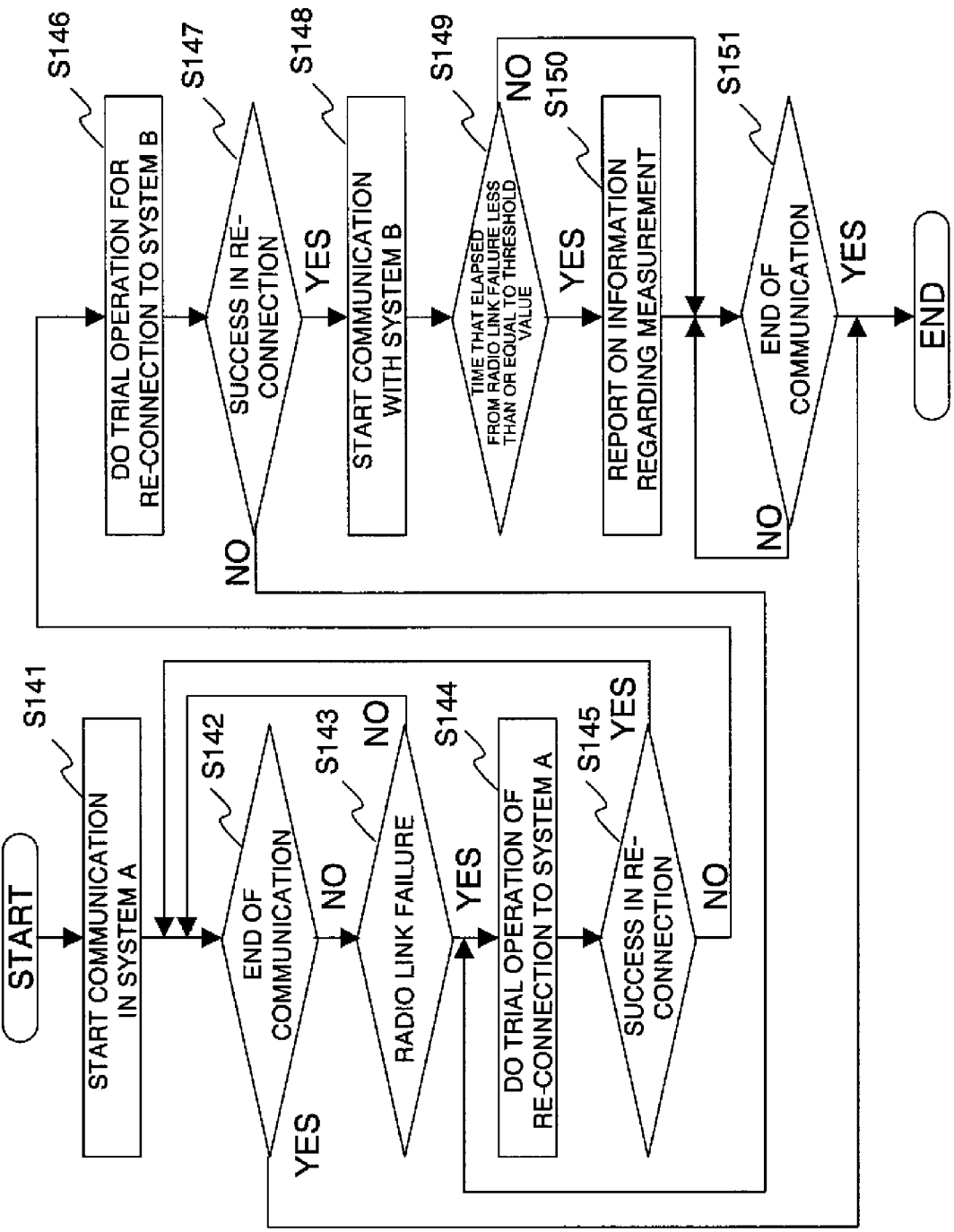
FIG. 11 is a flowchart illustrating the procedure of a further exemplary embodiment of the present invention.

FIG. 11 is a flowchart for illustrating the processing procedure of an exemplary embodiment of the present invention. Referring to FIGS. 6 and 11, the processing procedure of the present exemplary embodiment will be described.

A mobile station starts its communication with a base station of the system A (step S141). If, before the end of call (NO of step S142), the radio link connection control unit 35 of the mobile station (see FIG. 6) detects a radio link failure (YES of step S143), the radio link connection control unit 35 performs a trial operation of re-connection in the system A (step S144). If the re-connection succeeds (YES of step S145), a call is made. If the re-connection fails (NO of step S145), the radio link connection control unit performs a trial operation of re-connection to the base station of the system B (step S146). If the re-connection succeeds (YES of step S145), the radio link connection control unit begins communication with the base station of the system B (step S148). In case the elapsed time from the time of radio link failure is less than or equal to a preset threshold value (YES of step S149), the measurement data report control unit 39 of the mobile station reports measurement results (each including cell ID, common pilot signal reception level and the location information) of the cells A and B stored in the measurement data storage unit 38 (step S150). The report in the step S150 is transmitted to the base station of the system B of the handover destination and then to the management server. If the radio link failure in the system A occurs in e.g., a tunnel, there may be cases where reports from a plurality of mobile stations, re-connected to the cell B, are sent in a congested condition. In such case, reporting at the step S150 may not be made immediately at the time instant of re-connection to the cell B. Instead, the reporting may be made with a time delay or may be made via a base station of another cell to the management server. The communication is continued at the mobile station until the call is finished in the cell B (step S151).

In the present exemplary embodiment, the measurement start threshold value to be compared with the common pilot signal in the system B of the handover destination may be set at an earlier time point. This may be realized by the mobile station setting a higher value for the measurement start threshold value to be compared with the common pilot signal of the cell B of the handover destination, based on the measurement instruction from the base station, as described with reference to FIG. 1B.

If the elapsed time from the radio link failure exceeds a preset threshold value (NO of step S149), no reporting on the measurement result of the cells A or B is made. If the radio link connection control unit 35 of the mobile station fails in the step S147 in the trial operation for re-connection to the system B, the radio link connection control unit returns to the step S144 to perform the trial operation of re-connection to the system A.

Figure 12:
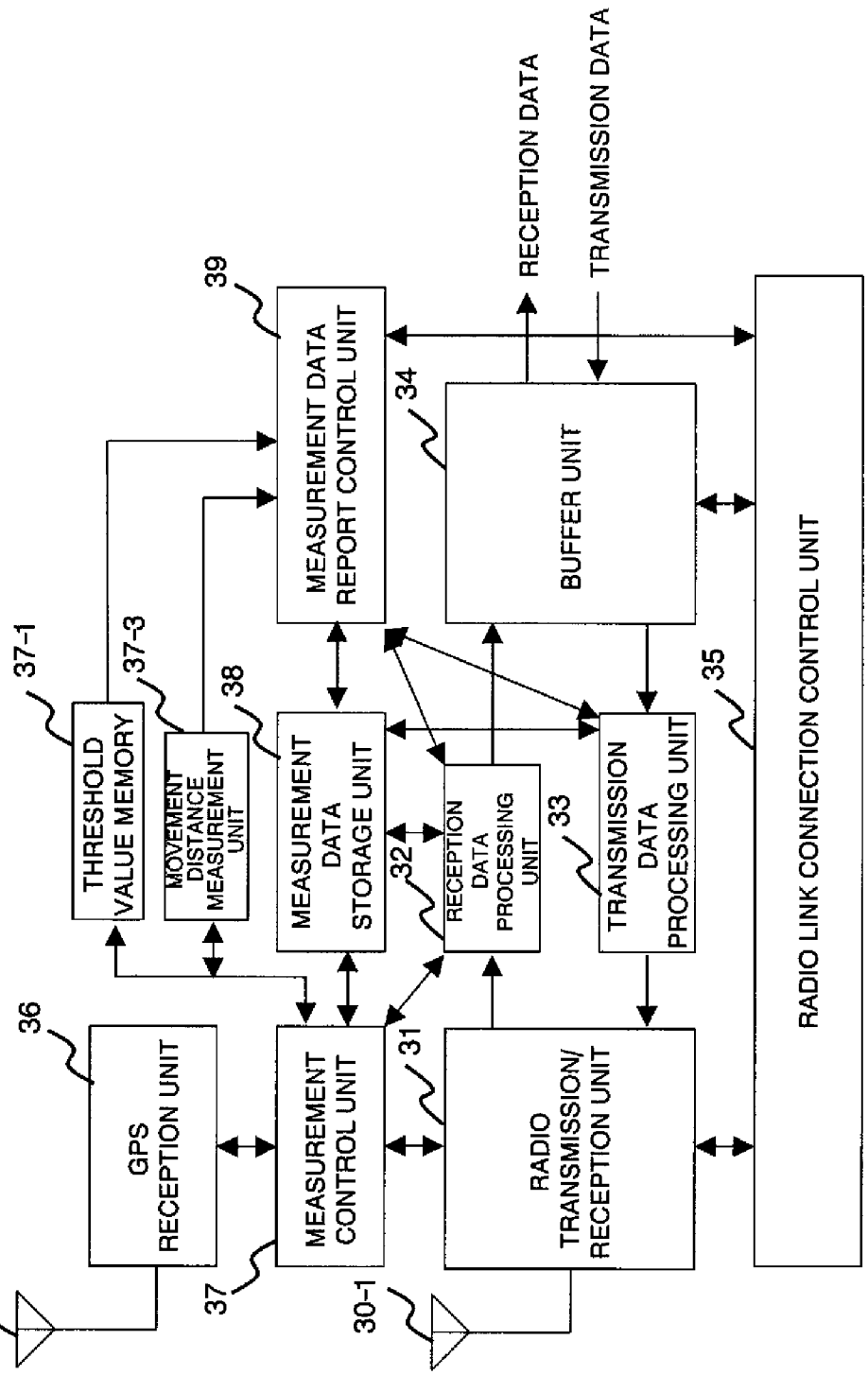
FIG. 12 is a block diagram showing a configuration of a mobile station according to a further exemplary embodiment of the present invention.

FIG. 12 shows a modification example of the mobile station shown in FIG. 6. Referring to FIG. 12, the mobile station in the present exemplary embodiment includes a movement distance measurement unit 37-3. When the radio link connection control unit 35 decides that radio link failure occurs, the movement distance measurement unit 37-3 starts measurement of a movement distance based on a start instruction from the measurement control unit 37. On re-connection, the movement distance measurement unit 37-3 stops the measurement of the movement distance responsive to a stop instruction from the measurement control unit 37. The movement distance of the mobile station, which is measured by the movement distance measurement unit 37-3, is supplied to the measurement data report control unit 39.

When the radio link failure occurs in handover, and the re-connection to a handover destination is established within a predefined time period, the measurement data report control unit 39 creates a report, inclusive of the cell information regarding the handover source and that of the handover destination. The measurement data report control unit 39 sends the so created report to the base station. In this case, the measurement data report control unit 39 compares the movement distance from the time of the radio link failure until the time of the re-connection, which is measured by the movement distance measurement unit 37-3, with the threshold value (distance) of the threshold value memory 37-1. If the movement distance from the time of the radio link failure until the time of the re-connection is less than or equal to the threshold value, the measurement data report control unit 39 creates a report and transmits it via the transmission data processing unit 33 and the radio transmission/reception unit 31. If, on the other hand, the movement distance from the time of the radio link failure until the time of the re-connection exceeds the threshold value, the measurement data report control unit 39 generates no report, and sends no report to the base station.

Figure 13:
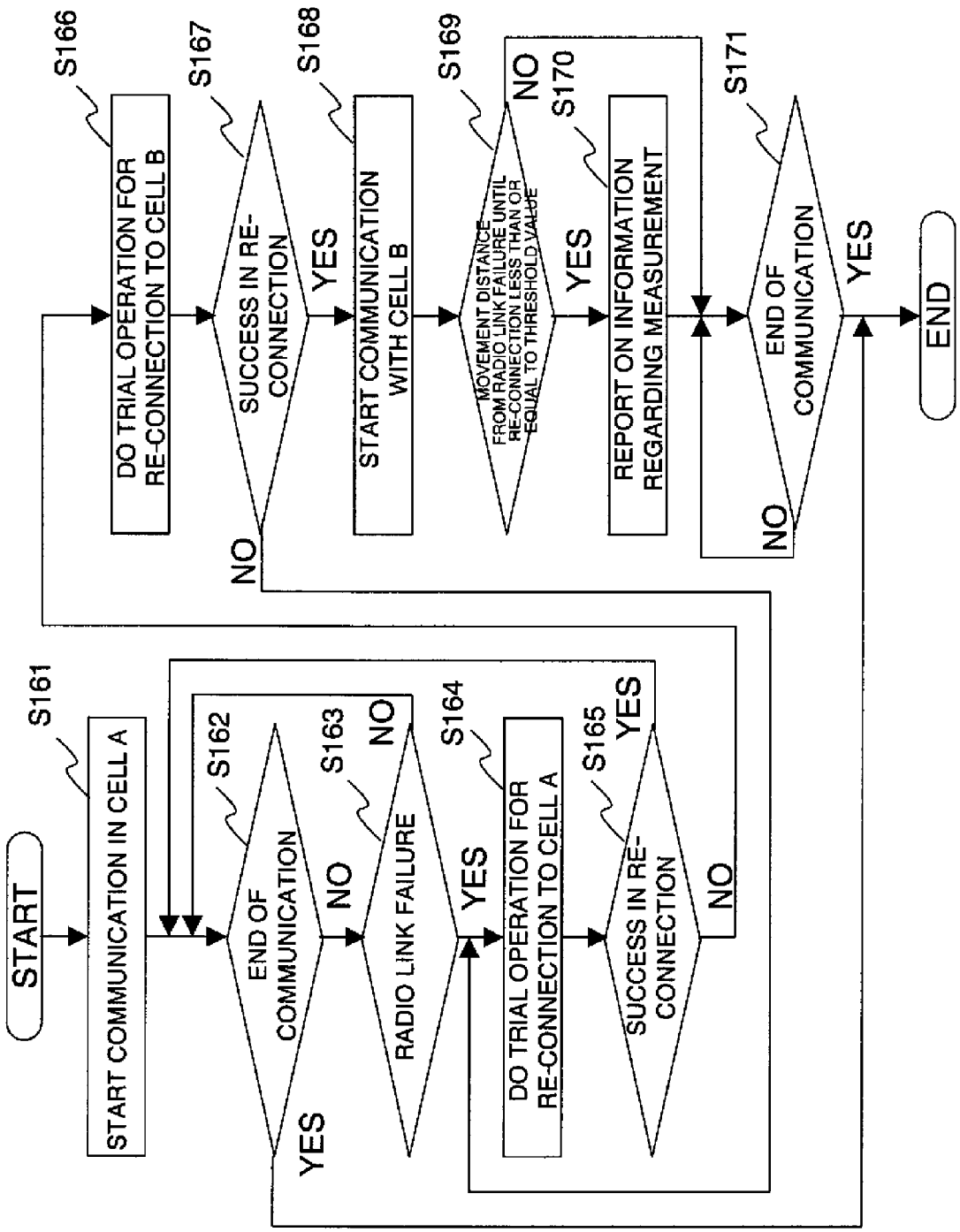
FIG. 13 is a flowchart illustrating the procedure of a further exemplary embodiment of the present invention.

FIG. 13 shows another example of handover in case of using the mobile station of FIG. 12. FIG. 13 corresponds to that of FIG. 9 except that FIG. 13 shows the case of the inter-frequency handover. FIG. 13 differs from FIG. 9 in that, in a step S169 of FIG. 13, corresponding to the step S109, it is determined whether or not the movement distance from the time of the radio link failure is less than or equal to the preset threshold value. If the movement distance from the time of radio link failure in the cell A until the time of the re-connection in the cell B is less than or equal to a preset threshold value (YES of step S159), the mobile station reports the measurement results of the cells A and B (step S170). If, in the mobile station, the movement distance during the time period from the radio link failure in the cell A until the re-connection in the cell B exceeds a preset threshold value (NO of step S169), no report is made of the measurement results of the cell A and the cell B. In the mobile station, communication is carried out until the call comes to a close in the cell B (step S171).

In the movement distance measurement unit 37-3 of the mobile station of FIG. 12, the movement distance from the time of the radio link failure until the time of the re-connection may be measured by the movement distance measurement function provided by an orientation/acceleration detection device. Or, the movement distance may be calculated based on the location information at the time of the radio link failure and that at the time of the re-connection, such as the location information as calculated by the GPS reception unit 36. Or, the GPS is not utilized, and the approximate movement distance may be calculated from the location information of the base station and from the propagation time of the electric wave between the mobile station and the base station.

As a modification of the present exemplary embodiment, a condition decision step of step S149 of FIG. 9 of determining whether or not the elapsed time from the radio link failure until the re-connection is less than or equal to a threshold value is added in the step S169 of FIG. 13, provided that, in this step S169, the movement distance by the mobile station from the time of the radio link failure until the time of the re-connection is less than or equal to a threshold value. A report on the cell information may be made in case both the condition that the movement distance of the mobile station from the radio link failure until the re-connection is not less than the threshold value and the condition that the elapsed time from the radio link failure until the re-connection is less than or equal to a threshold value are valid. In this case, the mobile station has both the timer 37-2 of FIG. 6 and the movement distance measurement unit 37-3 of FIG. 12.

In the steps S129 and S149 of FIGS. 10 and 11, the decision as to whether or not the elapsed time is less than or equal to the threshold value may be changed to the decision as to whether or not the movement distance is less than or equal to the threshold value.

Alternatively, in place of exercising the control of making a report when the elapsed time is less than or equal to the threshold value, as in step S129 of FIG. 10 or in step S149 of FIG. 11, a report may be made when the movement distance is less than or equal to the threshold value and the elapsed time is less than or equal to the threshold value.

Figure 14:
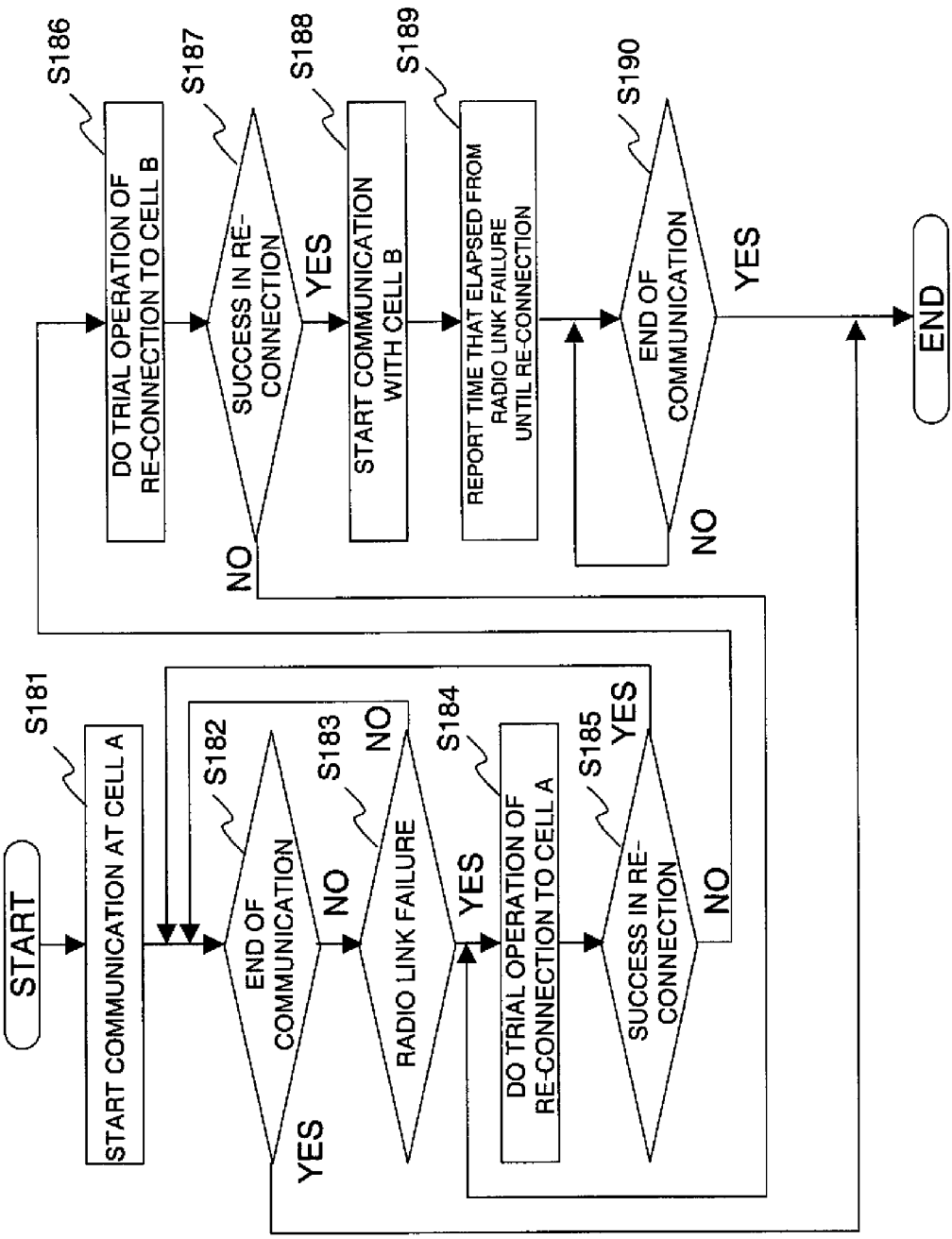
FIG. 14 is a flowchart illustrating the procedure of a further exemplary embodiment of the present invention.

Another exemplary embodiment of the present invention will now be described. In the present exemplary embodiment, the mobile station has a configuration as shown in FIG. 6. However, the contents of the report regarding the time period from the radio link failure until the re-connection differ from those of the above exemplary embodiment. FIG. 14 is a flowchart showing the procedure of the present exemplary embodiment.

Referring to FIG. 14, steps S181 to S188 respectively correspond to the steps S101 to S108 of FIG. 9. In the present exemplary embodiment, the elapsed time from the radio link failure of the mobile station until the re-connection is reported if the radio link failure occurred in the handover from the cell A to the cell B and the mobile station is re-connected to the cell B (step S189). That is, when the radio link connection control unit 35 decides that the radio link failure occurs, the timer 37-2 of the mobile station starts its time count with a start instruction from the measurement control unit 37. On re-connection, the timer 37-2 stops its time count responsive to a stop instruction from the measurement control unit 37. In this case, no timeout value is set in the timer 37-2, with the timer 37-2 operating as a stop watch. Or, the time point of the radio link failure and that of the re-connection may be read from a clock, not shown, provided on the mobile station, and the time difference between the two time points may be taken to find the elapsed time from the radio link failure until the re-connection. The elapsed time, as measured by the timer 37-3, is delivered to the measurement data report control unit 39.

The measurement data report control unit 39 sends a report, including the elapsed time from the radio link failure until the re-connection, via the transmission data processing unit 33 and the radio transmission/reception unit 31 to the base station. At this time, a report including the cell information of the cell where the radio link occurred, the cell information of the cell where re-connection has been established and the elapsed time may be created by the measurement data report control unit 39 and sent to the base station. More specifically, the measurement data report control unit 39 may combine the cell information (cell ID, pilot signal reception quality and location information) of the cell where the radio link failure occurred and the cell information (cell ID, pilot signal reception quality and location information) of the cell where the re-connection has been established, both measured by the measurement control unit 37 and stored in the measurement data storage unit 38, and the elapsed time to create a report and send the report to the base station. The measurement data report control unit 39 may send the elapsed time separately from the cell information. In the present exemplary embodiment, the management server (see FIG. 4) may exercise control, based on the report from the mobile station, so that, when the elapsed time from the radio link failure until the re-connection is less than or equal to a preset threshold value, a handover between the two cells, namely the cell where the radio link failure occurred and the cell of the re-connection, is caused to be allowed or facilitated.

In another exemplary embodiment of the present invention, the movement distance during the time period from the radio link failure until the re-connection may be reported in place of reporting the elapsed time from the time of radio link failure until re-connection in step S189 of FIG. 14. In the present exemplary embodiment, the mobile station includes the movement distance measurement unit 37-3 shown in FIG. 12. A report including the cell information of the cell where the radio link failure occurred, the cell information of the cell where re-connection has been established and the movement distance may be created by the measurement data report control unit 39 and sent to the base station. More specifically, the measurement data report control unit 39 may combine the cell information (cell ID, pilot signal reception quality and location information) of the cell where the radio link failure occurred and the cell information (cell ID, pilot signal reception quality and location information) of the cell where the re-connection has been established, both measured by the measurement control unit 37 and stored in the measurement data storage unit 38, and the movement distance to create a report and send the report to the base station. The movement distance may be reported separately from the cell information. In the present exemplary embodiment, the management server 4 (see FIG. 4) may exercise control, based on the report from the mobile station, so that, when the movement distance between the cell where the radio link failure occurred and cell where the re-connection has been established is less than or equal to a preset threshold value, a handover between the two cells, namely the cell where the radio link failure occurred and the cell of re-connection, is caused to be allowed or facilitated.

In a further exemplary embodiment of the present invention, the elapsed time as well as the movement distance during the time period from the radio link failure until the time of re-connection may be reported in step S189 of FIG. 14.

An exemplary embodiment in which the present invention is applied to SON (Self organizing/optimizing networks) having a SON server will now be described. In the following exemplary embodiment, the report of the measurement result of the above mentioned exemplary embodiment is termed 'SON measurement report' (see Patent Document 1).

Figure 15:
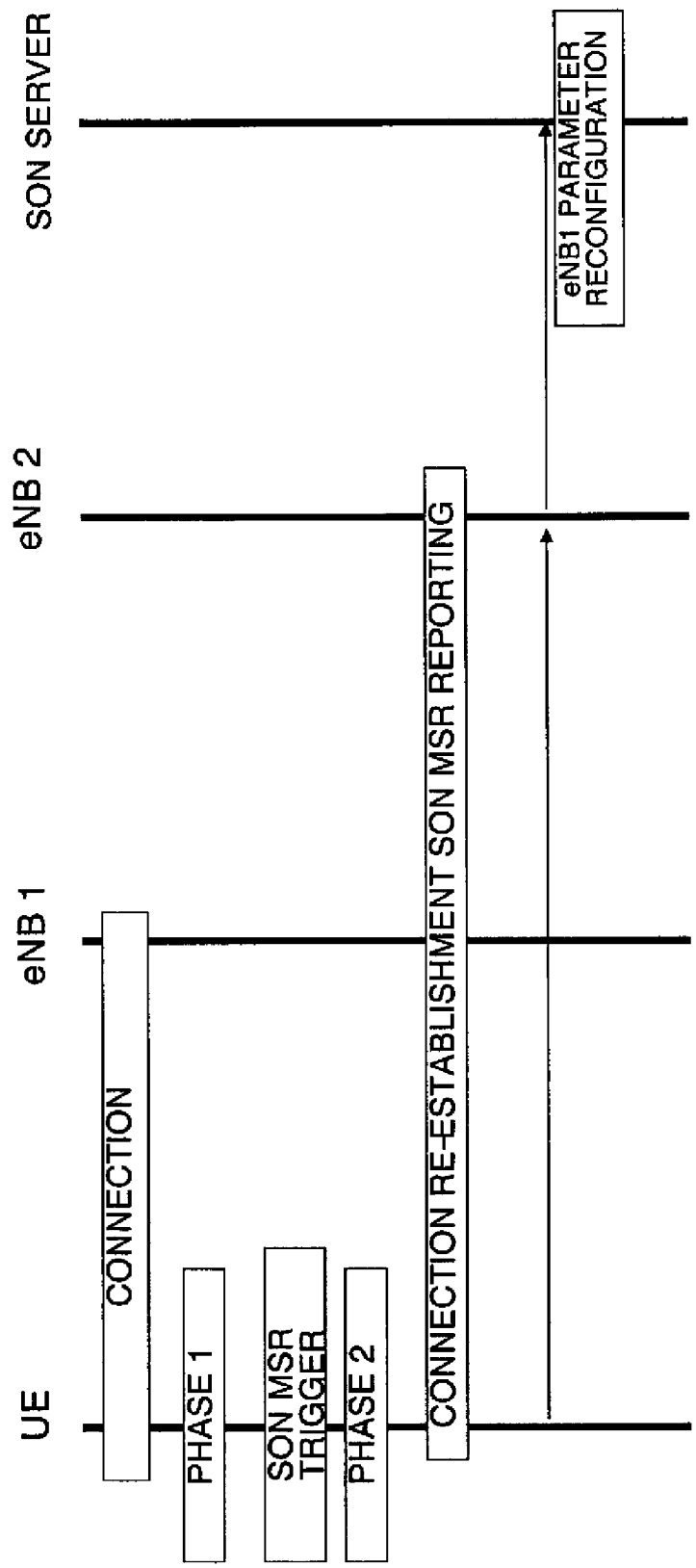
FIG. 15 shows a signaling flow of a SON measurement report.

Referring to FIG. 15, the mobile station (UE) is connected to a base station (eNB1) over a radio link. An occurrence of the radio link failure becomes a trigger to the SON measurement report (SON Measurement (MSR) trigger). A phase 1 (Phase 1) represents a state where the mobile station cannot get access to the cell and a phase 2 (Phase 2) represents a time when the mobile station searches not the current cell but another cell after the end of the phase 1 (Phase 1). When the connection to a base station (eNB2) is re-established (connection re-establishment), the SON measurement report is transmitted to the base station (eNB2) and then transmitted to the management server (SON server). The management server (SON server) re-configures radio parameters, for example, of the base station (eNB1) (eNB1 parameter reconfiguration).

When there is a radio link failure, the UE reports a SON measurement reporting in order to indicate an occurrence of a radio link failure. The measurement report may include the source cell information, target cell information and the location information (for example, the information regarding where the radio link failure occurred and the location of re-connection to the base station).

There are cases where the radio link failure could result from a coverage hole such as a tunnel without radio coverage. In that case, the UE can be reconnected to the network once it exists from the coverage hole and the UE can report the SON measurement report indicating the existence of network coverage hole. In some other cases, the radio link failure could occur due to incorrect configuration of cells as well. For example, it could be possible that the handover parameters between these two cells have not be configured so that the UE cannot be handovered while traveling from one cell to the other cell.

From LTE UE point of view, a UE is now assumed to be capable of searching any neighbor cell in the same frequency carrier without assistance from the network. For the case of inter-frequency intra-LTE handover and inter-RAT handover (UMTS (Universal Mobile Telecommunication System) and LTE), it is generally required that the UE needs some measurement gaps to perform the inter-frequency or inter-RAT (Radio Access Technology) measurements. Note that the required gap duration would be RAT specific and it may take non-negligible time to have the inter-RAT and inter-frequency measurements with a good level of accuracy. Therefore, if the network did not provide the UE with a sufficient gap duration, the UE will not be aware of existence of inter-frequency and inter-RAT cells and therefore the UE will experience the radio link failure when the serving cell quality drops. After the UE is re-connected to the network, the UE will send SON measurement report telling the radio link failure to the SON server.

To fix this problem of omitted handover configuration between two cells, an operator can firstly use the location information of the cell (source cell) where the UE lost the radio connection (radio link failure) and the other cell (target cell) where UE was reconnected to the network. If the location when the UE lost the radio connection is almost the same as the location where the UE is reconnected (that is, the movement distance during the time period from the radio link failure until the re-connection is less than a preset threshold value or the elapsed time from the radio link failure until the re-connection is less than a preset threshold value), then the operator can configure both cells to allow or facilitate handover between them.

If the distance between the location when the UE lost the radio connection and the location where the UE is reconnected are far away, i.e. more than a certain threshold, then operator should not configure both cells to enable handover between them. To support this, the UE should report both locations of the radio link failure and the connection re-establishment.

According to the present invention, a UE should be equipped with GPS capable location tracker. If the UE is not capable of GPS, then the location information can be obtained at cell level only. It would be possible to use this cell level information (i.e. source cell and target cell) and an operator can manually check the physical distance from the network deployment map to decide whether a handover should be allowed or facilitated between these two cells or not. In this case, there may be possible to allow the handover between cells in where a handover is not allowed or nor facilitated.

If the location is only provided in a two dimension, then it may possible that the operator to allow or facilitate the handover between cells in which a handover is not allowed nor facilitated. An example is the pico cell stored in a building. A user may move up and down floors in the building, with disconnecting and reconnecting to pico cells. Two dimensional information perhaps show all these pico cells should be configured for handover. The two-dimensional information could be such information indicating that the radio link failure and re-connection is performed on e.g., the same location because the movement distance on the two-dimensional information is approximately zero or less than a preset value. Hence, these pico-cells are configured for handover. On the other hand, there may be caused an inconvenience if the pico-cell should not be configured for handover. Thus, in the present exemplary embodiment, whether or not a handover should be allowed or facilitated may be determined, using the elapsed time from the radio link failure until the re-connection under a condition that the location of the mobile station is given as the two-dimensional location information. Alternatively, the location of the mobile station may be given as three dimensional location information.

In the present exemplary embodiment, there may be added in the report the time related information such that SON server can know how long it takes for UE to reconnect to the target cell.

If the time taken for re-connection is short, e.g. few seconds, then it would possible to judge that these two cells can be configured for handover. If the time taken for re-connection is long, e.g. few minutes, then it can indicate that there is no need for configuring handover for these cell.

According to the present invention, it does not matter whether or not the UE may be equipped with a function for obtaining GPS location information. Hence the present invention can be deployed more widely than location based solution. Also, the present invention is not limited by the limited dimension of location estimation. Therefore, the present invention can work for the example of pico cells in a high rise building with a user traveling up and down the elevator.

In the above exemplary embodiments, for example, in the exemplary embodiment shown in FIG. 4, a report on a radio link failure from a mobile station 3 is sent from the base station to the management server 4. It is to be noted that the present invention is not limited to this configuration. For example, the exemplary embodiment of FIG. 4 may be modified so that a report on a radio link failure received from the mobile station 3 is not sent by the base station to the management server 4. Instead, the base station, which has received the report on the radio link failure from the mobile station 3, may transfer the report via the gateway (GW) 1 to the base station provided in the cell where the radio link failure occurred. In the base station (corresponding to the cell where the radio link failure occurred), a handover may then allowed or facilitated.

The decision on the handover allowance or facilitation, described in the above exemplary embodiments, may, of course, be so set that a management server, for example, will receive a plurality of reports sent thereto from a plurality of mobile terminals via a base station to perform preset statistical processing to allow or facilitate a handover.

As described in the above, the present exemplary embodiments though not limited thereto, have the following arrangement:

[1] In the present exemplary embodiment, there is provided a mobile terminal characterized in that the mobile terminal, after experiencing a radio link failure followed by a re-connection, performs at least one of (A) reporting, in case at least one of a relation that an elapsed time from the radio link failure until the re-connection is less than or equal to a predetermined preset time length, and a relation that a movement distance of the mobile terminal during the time period from the radio link failure until the re-connection is less than or equal to a predetermined preset distance value, holds, cell information of at least one of a cell where the radio link failure occurred and a cell where the mobile terminal establishes the re-connection; and (B) reporting, at least one of the elapsed time from the radio link failure until the re-connection and the movement distance during the time period from the radio link failure until the re-connection.

[2] In the present exemplary embodiment, there is provided a mobile terminal according to [1] above, wherein the cell information includes at least cell location information.

[3] In the present exemplary embodiment, there is provided a mobile terminal according to [1] above, wherein the cell information of the cell where the radio link failure occurred includes at least one of an identification information of the cell, a reception quality of a pilot signal from a base station immediately before the radio link failure, and a location information.

[4] In the present exemplary embodiment, there is provided a mobile terminal according to [1] or [3] above, wherein the cell information of the cell where the mobile terminal establishes the re-connection includes at least one of an identification information regarding of cell, a reception quality of a pilot signal from a base station at a location of the re-connection, and a location information.

[5] In the present exemplary embodiment, there is provided a mobile terminal according to any one of [1] to [4] above that, in case of the radio link failure followed by the re-connection, reports at least one of an elapsed time from the radio link failure until the re-connection, and a movement distance during the time period from the radio link failure until the re-connection.

[6] In the present exemplary embodiment, there is provided a mobile terminal that, in case of the radio link failure followed by the re-connection, reports at least one of the elapsed time from the radio link failure until the re-connection, and the movement distance during the time period from the radio link failure until the re-connection.

[7] In the present exemplary embodiment, there is provided a mobile terminal according to any one of [1] to [6] above, comprising a means that exercises control to start measurement of a reception quality of a second cell when a reception quality of a first cell is below a preset threshold value, the threshold value being set to a higher value, based on a measurement instruction from the base station, to allow the measurement of the reception quality of the second cell to be started at an earlier time point.

[8] In the present exemplary embodiment, there is provided a mobile terminal according to any one of [1] to [4], wherein the location information has a location accuracy finer than a cell area.

[9] In the present exemplary embodiment, there is provided a mobile terminal according to any one of [1] to [4], wherein the location information has cell-based location accuracy.

[10] In the present exemplary embodiment, there is provided a mobile terminal according to [1] above, comprising
a mobile terminal according to [1] above, comprising
a means that acquires a location information;
a means that measures a reception quality of a pilot signal from a base station;
a means that controls the radio link failure and the re-connection;
a means that measures the elapsed time from the radio link failure until the re-connection;
a means that stores a threshold value for the elapsed time from the radio link failure until the re-connection;
a means that compares the elapsed time from the radio link failure until the re-connection with the threshold value, when re-connection is established after the radio link failure, and prepares, in case the elapsed time is less than or equal to the preset threshold value, a report including at least one of the reception quality of a pilot signal from a base station immediately before the radio link failure, the reception quality of a pilot signal from a base station at a location of the re-connection, respective location information and respective cell identification information; and
a means that transmits the report to the base station.

[11] In the present exemplary embodiment, there is provided a mobile terminal according to [1] above, comprising
a means that obtains a location information;
a means that measures a reception quality of a pilot signal from a base station;
a means that controls a radio link failure and a re-connection;
a means that measures a movement distance during the time period from the radio link failure until the re-connection;
a means that stores a threshold value for the movement distance during the time period from the radio link failure until the re-connection;
a means that compares the movement distance during the time period from the radio link failure until the re-connection with the threshold value, when the re-connection is established after the radio link failure, and that prepares, in case the movement distance is less than or equal to the threshold value, a report including at least one of the reception quality of a pilot signal from a base station immediately before the radio link failure, the reception quality of a pilot signal from a base station at a location of the re-connection, respective location information and respective cell identification information; and
a means that transmits the report to the base station.

[12] In the present exemplary embodiment, there is provided a base station characterized in that the base station receives a report from a mobile terminal that, after experiencing a radio link failure followed by re-connection thereof, performs at least one of (A) reporting, in case at least one of a relation that an elapsed time from the radio link failure until the re-connection is less than or equal to a predetermined preset time length and a relation that a movement distance of the mobile terminal during the time period from the radio link failure until the re-connection is less than or equal to a predetermined preset distance value, holds, cell information of at least one of a cell where the radio link failure occurred and a cell where the mobile terminal establishes the re-connection; and (B) reporting, at least one of the elapsed time from the radio link failure until the re-connection and the movement distance during the time period from the radio link failure until the re-connection.

[13] In the present exemplary embodiment, there is provided a base station according to (12) above, wherein a handover between a cell where the radio link failure occurred and a cell where the mobile terminal establishes the re-connection is controlled to be allowed or facilitated, in case at least one of a relation that the elapsed time from the radio link failure until the re-connection of the mobile terminal being less than or equal to a preset threshold value, and a relation that the movement distance during the time period from the radio link failure until the re-connection of the mobile terminal being less than or equal to a preset threshold value, holds.

[14] In the present exemplary embodiment, there is provided a management server characterized in that the management server receives, via a base station, a report from a mobile terminal that, after experiencing a radio link failure followed by re-connection thereof, performs at least one of (A) reporting, in case at least one of a relation that an elapsed time from the radio link failure until the re-connection is less than or equal to a predetermined preset time length and a relation that a movement distance of the mobile terminal during the time period from the radio link failure until the re-connection is less than or equal to a predetermined preset distance value, holds, cell information of at least one of a cell where the radio link failure occurred and a cell where the mobile terminal establishes the re-connection; and (B) reporting, at least one of the elapsed time from the radio link failure until the re-connection and the movement distance during the time period from the radio link failure until the re-connection.

[15] In the present exemplary embodiment, there is provided the management server according to [14] above, wherein the management server exercises control to allow for or facilitate a handover between the cell where the radio link failure occurred and the cell where the mobile terminal establishes the re-connection, in case at least one of a relation that the elapsed time from the radio link failure until the re-connection of the mobile terminal being less than or equal to a preset threshold value; and a relation that the movement distance of the mobile terminal during the time period from the radio link failure until the re-connection thereof being less than or equal to a preset threshold value, holds.

[16] In the present exemplary embodiment, there is provided a method for radio communication, comprising:
comprising:
after a mobile terminal experiencing a radio link failure followed by the re-connection thereof, performing by the mobile terminal, at least one of (A) reporting, in case at least one of a relation that an elapsed time from the radio link failure until the re-connection is less than or equal to a predetermined preset time length and a relation that a movement distance of the mobile terminal during the time period from the radio link failure until the re-connection is less than or equal to a predetermined preset distance value, holds, cell information of at least one of a cell where the radio link failure occurred and a cell where the mobile terminal establishes the re-connection; and (B) reporting, at least one of the elapsed time from the radio link failure until the re-connection and the movement distance during the time period from the radio link failure until the re-connection.

[17] In the present exemplary embodiment, there is provided a method for radio communication according to [16] above, wherein the cell information includes at least cell location information.

[18] In the present exemplary embodiment, there is provided the method for radio communication according to [16] above, wherein the cell information regarding a cell where the radio link failure occurred includes at least one of the identification information regarding the cell, a reception quality of a pilot signal from a base station immediately before the radio link failure, and a location information.

[19] In the present exemplary embodiment, there is provided a method for radio communication according to [16] or [18] above, wherein the cell information of the cell where the mobile terminal establishes the re-connection includes at least one of an identification information regarding the cell;

a reception quality of a pilot signal from a base station on a location of the re-connection; and a location information.

[20] In the present exemplary embodiment, there is provided a method for radio communication according to any one of [16] to [19] above, wherein after experiencing the radio link failure followed by the reconnection, the mobile terminal reports at least one of the elapsed time from the radio link failure until the re-connection; and the movement distance during the time period from the radio link failure until the re-connection.

[21] In the present exemplary embodiment, there is provided a method for radio communication, wherein after experiencing radio link failure followed by the re-connection, the mobile terminal reports at least one of the elapsed time from the radio link failure until re-connection, and the movement distance during the time period from the radio link failure until re-connection.

[22] In the present exemplary embodiment, there is provided a method for radio communication according to any one of [16] to [21] above, wherein when a reception quality at the mobile terminal of a first cell becomes lower than a preset threshold value, measurement of the reception quality of a second cell is controlled to be started, the preset threshold value being set to a higher value, based on a measurement instruction from a base station, to allow the measurement of the reception quality of the second cell by the mobile station to be started at an earlier time point.

[23] In the present exemplary embodiment, there is provided a method for radio communication according to any one of [16] to [21] above, wherein whether or not a handover between a cell where the radio link failure occurred and the cell where the mobile terminal establishes the re-connection is to be allowed or facilitated is determined based on the report.

[24] In the present exemplary embodiment, there is provided a method for radio communication, wherein in case the distance between the location where the mobile terminal experienced the radio link failure and the location where the mobile terminal re-connects to a network is less than or equal to a preset value, a handover between a cell where the radio link failure occurred and a cell where the mobile terminal re-connects to a network is allowed or facilitated, using the information regarding the location where the mobile terminal experienced the radio link failure and the information regarding the location where the mobile terminal re-connects to the network.

[25] In the present exemplary embodiment, there is provided a method for radio communication according to [24] above, wherein the mobile terminal reports the information regarding the location where the mobile terminal experienced the radio link failure and the information regarding the location where the mobile terminal re-connects to the network.

[26] In the present exemplary embodiment, there is provided a method for radio communication according to [24] or [25] above, wherein when, under the condition that the location information is given by a limited number of dimensions, the time from the mobile terminal experiencing the radio link failure in a cell until the re-connection thereof in another cell, is less than or equal to a preset threshold, where the handover between the cell and the another cell is not allowed or nor facilitated, a handover between the cell where the mobile terminal experienced the radio link failure and the another cell of the re-connection is allowed or facilitated.

[27] In the present exemplary embodiment, there is provided a method for radio communication, wherein when the mobile terminal experienced the radio link failure, and the time from the radio link failure until the re-connection thereof is less than or equal to a preset threshold value, a handover is allowed or facilitated between the cell where the mobile terminal experienced the radio link failure and the cell where the mobile terminal establishes the re-connection.

[28] In the present exemplary embodiment, there is provided a method for radio communication, wherein when the mobile terminal experienced the radio link failure, the time from the radio link failure until the re-connection thereof is less than or equal to a preset threshold, and the distance between a location where the mobile terminal experienced the radio link failure and a location where the mobile terminal establishes the re-connection is less than or equal to a preset threshold, a handover is allowed or facilitated between the cell of the radio link failure and the cell of the re-connection.

if a mobile terminal undergoes a radio link failure, the time from the radio link failure of the mobile terminal until re-connection thereof is less than or equal to a preset threshold, and the distance between a location where the mobile terminal experienced the radio link failure and a location of re-connection thereof is less than or equal to a preset threshold, a handover is allowed or facilitated between the cell of radio link failure and the cell of re-connection.

[29] In the present exemplary embodiment, there is provided a method for radio communication according to any one of [23], [24], [26], [27] and [28], wherein in a control in which when a reception quality of a given cell has become lower than the preset threshold, a reception quality of another cell of the destination of a handover is started, the threshold value for the reception quality is set to a higher value to allow the measurement of the reception quality of the another cell to be started at an earlier time point to facilitate the handover.

[30] In the present exemplary embodiment, there is provided a method for radio communication according to any one of [16] to [19], [24] to [26], [28] and [29], wherein the location information has a location accuracy finer than a cell area.

[31] In the present exemplary embodiment, there is provided a method for radio communication according to any one of [16] to [19], [24] to [26], [28] and [29], wherein the location information has a cell-based location accuracy.

[32] In the present exemplary embodiment, there is provided a radio communication system comprising: first and second cells;

a mobile terminal which, when, in case of experiencing a radio link failure in the first cell and then establishing a re-connection to the second cell, at least one of a relation that an elapsed time from the radio link failure until the re-connection is less than or equal to a predetermined preset time length and a relation that the movement distance during the time period from the radio link failure until the re-connection is less than or equal to a predetermined preset distance value, holds, reports to a base station at least one of the cell information regarding a cell where the radio link failure occurred and the cell information regarding a cell where the mobile terminal establishes the re-connection.

[33] In the present exemplary embodiment, there is provided a radio communication system according to [32] above, wherein the cell information includes at least cell location information.

[34] In the present exemplary embodiment, there is provided a radio communication system according to [32] above, wherein the cell information regarding the first cell where the radio link failure occurred includes at least one of an identification information of the first cell, a reception quality of a pilot signal from a base station immediately before the radio link failure, and a location information.

[35] In the present exemplary embodiment, there is provided a radio communication system according to [32] to [34], wherein the cell information regarding the second cell where the mobile terminal establishes the re-connection includes at least one of an identification information of the second cell, a reception quality of a pilot signal from a base station at a location of the re-connection, and a location information.

[36] In the present exemplary embodiment, there is provided a radio communication system according to [32] or [35] above, wherein when the mobile terminal establishes the re-connection after the radio link failure, the mobile terminal reports at least one of the elapsed time from the radio link failure until the re-connection, and the movement distance during the time period from the radio link failure until the re-connection.

[37] In the present exemplary embodiment, there is provided a radio communication system, wherein when a mobile terminal establishes a re-connection after experiencing a radio link failure, the mobile terminal reports at least one of an elapsed time from the radio link failure until the re-connection, and a movement distance during the time period from the radio link failure until the re-connection.

[38] In the present exemplary embodiment, there is provided a radio communication system according to any one of [32] to [37] above, in which, when the reception quality of the first cell has become lower than a preset threshold value, measurement of the reception quality of the second cell is controlled to be started. The threshold value for the reception quality is set to a higher value, based on a measurement instruction from a base station, thereby allowing the measurement of the reception quality of the second cell to be started at an earlier time point.

[39] In the present exemplary embodiment, there is provided a radio communication system according to any one of [32] to [38], wherein whether or not a handover is to be allowed or facilitated between the cell where the radio link failure occurred and the cell wherein the mobile terminal establishes the re-connection is determined based on the report.

[40] In the present exemplary embodiment, there is provided a radio communication system, wherein in case a distance between a location where a mobile terminal experienced a radio link failure and a location where the mobile terminal establishes a re-connection to a network is less than or equal to a preset value, a handover between a cell where the radio link failure occurred and a cell where the mobile terminal establishes the re-connection to the network is allowed or facilitated, using the information regarding the location where the mobile terminal experienced a radio link failure and the information regarding the location of re-connection to the network.

[41] In the present exemplary embodiment, there is provided a radio communication system according to [40] above, wherein the mobile terminal reports the information regarding the location of the radio link failure and the information regarding the location of the re-connection to the network.

[42] In the present exemplary embodiment, there is provided a radio communication system according to [40] or [41] above, wherein when, in a condition that the location information is given by a limited number of dimensions, the time from the radio link failure of the mobile terminal until the re-connection thereof between two cells where a handover is not allowed or nor facilitated is less than or equal to a preset threshold, the handover is allowed or facilitated between a cell where the radio link failure occurred and a cell where re-connection has occurred.

[43] In the present exemplary embodiment, there is provided a radio communication system, wherein when, in case the mobile terminal experienced a radio link failure, an elapsed time from the radio link failure until a re-connection is less than or equal to a preset threshold value, a handover between a cell of the radio link failure and a cell of re-connection is allowed or facilitated.

[44] The radio communication system, wherein when, in case a mobile terminal experienced a radio link failure, an elapsed time from the radio link failure until a re-connection of the mobile terminal is less than or equal to a preset threshold value, and a movement distance during the time period from the radio link failure until the re-connection is less than or equal to a preset threshold value, a handover between a cell of the radio link failure and a cell of re-connection is allowed or facilitated.

[45] In the present exemplary embodiment, there is provided a radio communication system according to any one of [39], [40], [42], [43] and [44] above, further comprising: a means that is operative in case of a reception quality of a cell becoming lower than a preset threshold value to control starting the measurement of a reception quality of another cell, as a handover destination, the threshold value for the reception quality being set to a higher value to allow the measurement of the reception quality of the other cell to be started at an earlier time point to facilitate the handover.

[46] In the present exemplary embodiment, there is provided a radio communication system according to any one of [32] to [35], [40] to [42] and [44], wherein the location information has a location accuracy finer than a cell area.

[47] In the present exemplary embodiment, there is provided a system for radio communication according to any one of [32] to [35], [40] to [42] and [44], wherein the location information has a cell-based location accuracy.

[48] In the present exemplary embodiment, there is provided a program for causing a computer composing the mobile terminal to execute the processing comprising, after experiencing a radio link failure followed by a re-connection thereof, performs at least one of (A) reporting, in case at least one of a relation that an elapsed time from the radio link failure until the re-connection is less than or equal to a predetermined preset time length and a relation that a movement distance of the mobile terminal during the time period from the radio link failure until the re-connection is less than or equal to a predetermined preset distance value, holds, cell information of at least one of a cell where the radio link failure occurred and a cell where the mobile terminal establishes the re-connection; and (B) reporting, at least one of the elapsed time from the radio link failure until the re-connection and the movement distance during the time period from the radio link failure until the re-connection.

[49] In the present exemplary embodiment, there is provided a program according to [48] above, wherein the program causes the computer composing the mobile terminal to execute the processing comprising:

when a reception quality of a first cell has become lower than a preset threshold value, controlling to start measurement of a reception quality of a second cell, with setting the threshold value for the reception quality to a higher value, based on a measurement instruction from a base station, to allow the measurement of the reception quality of the second cell to be started at an earlier time point.

The particular exemplary embodiments or examples may be modified or adjusted within the gamut of the entire disclosure of the present invention, inclusive of claims, based on the fundamental technical concept of the invention. Further, variegated combinations or selection of elements disclosed herein may be made within the framework of the claims. That is, the present invention may comprehend various modifications or corrections that may occur to those skilled in the art in accordance with and within the gamut of the entire disclosure of the present invention, inclusive of claims and the technical concept of the present invention.

The invention claimed is:

1. A mobile terminal comprising:
    a unit that, after an occurrence of a radio link failure, tries to re-connect to a network;
    a unit that, performs at least one of
    (A) reporting, in case at least one of a relation that an elapsed time from the radio link failure until the re-connection is less than or equal to a preset time length, and a relation that a movement distance of the mobile terminal during the time period from the radio link failure until the re-connection is less than or equal to a preset distance value, holds, cell information of at least one of a cell where the radio link failure occurred and a cell where the mobile terminal establishes the re-connection; and
    (B) reporting, at least one of the elapsed time from the radio link failure until the re-connection and the movement distance during the time period from the radio link failure until the re-connection; and
    a measurement control unit that exercises control to start measurement of a reception quality of a second cell when a reception quality of a first cell is below a preset threshold value, the measurement control unit setting the threshold value to a higher value, based on a measurement instruction from a base station, to allow the measurement of the reception quality of the second cell to be started at an earlier time point.

2. The mobile terminal according to claim 1, wherein the cell information includes at least cell location information.

3. The mobile terminal according to claim 1, wherein the cell information of the cell where the radio link failure occurred includes at least one of an identification information of the cell; a reception quality of a pilot signal from a base station immediately before the radio link failure; and a location information.

4. The mobile terminal according to claim 3, wherein the cell information of the cell wherein the mobile terminal establishes the re-connection includes at least one of an identification information of the cell; a reception quality of a pilot signal from a base station on a location of the re-connection; and a location information.

5. The mobile terminal according to claim 1, wherein the location information has a location accuracy finer than a cell area.

6. The mobile terminal according to claim 1, wherein the location information has a location accuracy on a per cell basis.

7. The mobile terminal according to claim 1, comprising:
    a unit that acquires a location information;
    a unit that measures a reception quality of a pilot signal from a base station;
    a unit that controls the radio link failure and the re-connection;
    a unit that measures the elapsed time from the radio link failure until the re-connection;
    a unit that stores a threshold value for the elapsed time from the radio link failure until the re-connection;
    a unit that compares the elapsed time from the radio link failure until the re-connection with the threshold value, when re-connection is established after the radio link failure, and prepares, in case the elapsed time is less than or equal to the preset threshold value, a report including at least one of the reception quality of a pilot signal from a base station immediately before the radio link failure, the reception quality of a pilot signal from a base station at a location of the re-connection, respective location information and respective cell identification information; and
a unit that transmits the report to the base station.

8. The mobile terminal according to claim 1, comprising:
a unit that obtains a location information; a unit that measures a reception quality of a pilot signal from a base station;
a unit that controls a radio link failure and a re-connection;
a unit that measures a movement distance during the time period from the radio link failure until the re-connection;
a unit that stores a threshold value for the movement distance during the time period from the radio link failure until the re-connection;
a unit that compares the movement distance during the time period from the radio link failure until the re-connection with the threshold value, when the re-connection is established after the radio link failure, and that prepares, in case the movement distance is less than or equal to the threshold value, a report including at least one of the reception quality of a pilot signal from a base station immediately before the radio link failure, the reception quality of a pilot signal from a base station at a location of the re-connection, respective location information and respective cell identification information; and
a unit that transmits the report to the base station.

9. The mobile terminal of claim 1, wherein the threshold value is set for a mobile terminal to start a reception quality of a second cell, when a reception quality of a first cell is below the threshold value.

10. A base station comprising:
a unit that controls a mobile terminal;
a unit that receives a report from the mobile terminal that, after experiencing a radio link failure followed by a re-connection thereof, performs at least one of
(A) reporting, in case at least one of a relation that an elapsed time from the radio link failure until the re-connection is less than or equal to a predetermined preset time length and a relation that a movement distance of the mobile terminal during the time period from the radio link failure until the re-connection is less than or equal to a predetermined preset distance value, holds, cell information of at least one of a cell where the radio link failure occurred and a cell where the mobile terminal establishes the re-connection; and
(B) reporting, at least one of the elapsed time from the radio link failure until the re-connection and the movement distance during the time period from the radio link failure until the re-connection;
a unit that sends a measurement instruction to the mobile terminal exercising control to start measurement of a reception quality of a second cell when a reception quality of a first cell is below a preset threshold value, the measurement instruction instructing the mobile terminal to change a threshold value to a higher value, to allow the mobile terminal to start the measurement of the reception quality of the second cell at an earlier time point; and
a unit that exercises control to allow for or facilitate a handover between the cell where the radio link failure occurred and the cell where the mobile terminal establishes the re-connection, so that at least one of
i) a relation that the elapsed time from the radio link failure until the re-connection of the mobile terminal being less than or equal to a preset threshold value holds, and
ii) a relation that the movement distance during the time period from the radio link failure until the re-connection of the mobile terminal being less than or equal to a preset threshold value holds.

11. A management server comprising:
a unit that controls a mobile terminal via a base station; and
a unit that receives, via the base station, a report from the mobile terminal that, after experiencing a radio link failure followed by a re-connection thereof, performs at least one of
(A) reporting, in case at least one of a relation that an elapsed time from the radio link failure until the re-connection is less than or equal to a predetermined preset time length and a relation that a movement distance of the mobile terminal during the time period from the radio link failure until the re-connection is less than or equal to a predetermined preset distance value, holds, cell information of at least one of a cell where the radio link failure occurred and a cell where the mobile terminal establishes the re-connection; and
(B) reporting, at least one of the elapsed time from the radio link failure until the re-connection and the movement distance during the time period from the radio link failure until the re-connection;
a unit that sends a measurement instruction via the base station to the mobile terminal exercising control to start measurement of a reception quality of a second cell when a reception quality of a first cell is below a preset threshold value, the measurement instruction instructing the mobile terminal to change a threshold value to a higher value, to allow the mobile terminal to start the measurement of the reception quality of the second cell at an earlier time point; and
a unit that exercises control to allow for or facilitate a handover between the cell where the radio link failure occurred and the cell where the mobile terminal establishes the re-connection, so that at least one of
i) a relation that the elapsed time from the radio link failure until the re-connection of the mobile terminal being less than or equal to a preset threshold value holds, and
ii) a relation that the movement distance of the mobile terminal during the time period from the radio link failure until the re-connection thereof being less than or equal to a preset threshold value holds.

12. A method for radio communication, comprising:
a mobile terminal, after experiencing a radio link failure, establishing a re-connection thereof;
the mobile terminal performing, at least one of
(A) reporting, in case at least one of a relation that an elapsed time from the radio link failure until the re-connection is less than or equal to a predetermined preset time length and a relation that a movement distance of the mobile terminal during the time period from the radio link failure until the re-connection is less than or equal to a predetermined preset distance value, holds, cell information of at least one of a cell where the radio link failure occurred and a cell where the mobile terminal establishes the re-connection; and
(B) reporting, at least one of the elapsed time from the radio link failure until the re-connection and the movement distance during the time period from the radio link failure until the re-connection; and
the mobile terminal performing control to start measurement of a reception quality of a second cell when a reception quality of a first cell is below a preset threshold value, the mobile terminal, in the control, setting the threshold value to a higher value, based on a measurement instruction from a base station, to allow the measurement of the reception quality of the second cell to be started at an earlier time point.

13. A radio communication system comprising:
one or more cells; and a mobile terminal that, in case of experiencing a radio link failure and then establishing a re-connection, performs at least one of
(A) reporting, in case at least one of a relation that an elapsed time from the radio link failure until the re-connection is less than or equal to a predetermined preset time length and a relation that a movement distance of the mobile terminal during the time period from the radio link failure until the re-connection is less than or equal to a predetermined preset distance value, holds, cell information of at least one of a cell where the radio link failure occurred and a cell where the mobile terminal establishes the re-connection; and
(B) reporting to the base station, at least one of the elapsed time from the radio link failure until the re-connection and the movement distance during the time period from the radio link failure until the re-connection,
wherein the mobile terminal exercises control to start measurement of a reception quality of a second cell when a reception quality of a first cell measured by the mobile terminal is below a preset threshold value, the mobile terminal, in the control, setting the threshold value to a higher value, based on a measurement instruction from a base station, to allow the measurement of the reception quality of the second cell to be started at an earlier time point.

14. The radio communication system according to claim 13, wherein the cell information includes at least cell location information.

15. The radio communication system according to claim 13, wherein the cell information regarding the first cell where the radio link failure occurred includes at least one of an identification information of the first cell; a reception quality of a pilot signal from a base station immediately before the radio link failure; and a location information.

16. The radio communication system according to claim 13, wherein the cell information regarding the second cell where the re-connection occurred includes at least one of
an identification information of the second cell;
a reception quality of a pilot signal from a base station on a location of the re-connection; and
a location information.

17. The radio communication system according to claim 13, wherein whether or not a handover is to be allowed or facilitated between the cell where the mobile terminal experienced the radio link failure and the cell where the mobile terminal establishes the re-connection is determined based on the report.

18. The radio communication system according to claim 17, further comprising:
a unit that is operative in case of the reception quality of a cell becoming lower than a preset threshold value to control starting the measurement of the reception quality of another cell, as a handover destination; the threshold value for the reception quality being set to a higher value to allow the measurement of the reception quality of the another cell to be started at an earlier time point to facilitate the handover.

19. The radio communication system according to claim 13, wherein in case the distance between the location where the mobile terminal experienced the radio link failure and the location where the mobile terminal re-connects to a network is less than or equal to a preset value, a handover between the cell where the radio link failure occurred and the cell the re-connection of the mobile terminal to the network is allowed or facilitated, using the information regarding the location where the mobile terminal experienced the radio link failure and the information regarding the location of the re-connection of the mobile terminal to the network.

20. The radio communication system according to claim 19, wherein the mobile terminal reports the information regarding the location of the radio link failure and the information regarding the location of the re-connection to the network.

21. The radio communication system according to claim 19, wherein when, in case the location information is given by a limited number of dimensions, the time from the radio link failure of the mobile terminal until the re-connection thereof between two cells where a handover is not allowed or nor facilitated is less than or equal to a preset threshold, the handover is allowed or facilitated between the cell where the radio link failure occurred and the cell where re-connection has occurred.

22. The radio communication system according to claim 13, wherein when, in case the mobile terminal experienced the radio link failure, the elapsed time from the radio link failure until the re-connection of the mobile terminal is less than or equal to a preset threshold value, a handover between the cell where the radio link failure occurred and the cell of re-connection is allowed or facilitated.

23. The radio communication system according to claim 13, wherein when, in case the mobile terminal experienced the radio link failure, the elapsed time from the radio link failure until the re-connection of the mobile terminal is less than or equal to a preset threshold value, and the movement distance during the time period from the radio link failure until the re-connection of the mobile terminal is less than or equal to a preset threshold value, a handover between a cell of the radio link failure and a cell of re-connection is allowed or facilitated.

24. The radio communication system according to claim 13, wherein the location information has a location accuracy finer than a cell area.

25. The radio communication system according to claim 13, wherein the location information has a location accuracy on a per cell basis.

26. A non-transitory computer readable recording medium storing a program for causing a computer composing a mobile terminal to execute the processing comprising,
establishing a re-connection, after experiencing a radio link failure;
performing at least one of (A) reporting, in case at least one of a relation that an elapsed time from the radio link failure until the re-connection is less than or equal to a predetermined preset time length and a relation that a movement distance of the mobile terminal during the time period from the radio link failure until the re-connection is less than or equal to a predetermined preset distance value, holds, cell information of at least one of a cell where the radio link failure occurred and a cell where the mobile terminal establishes the re-connection; and (B) reporting, at least one of the elapsed time from the radio link failure until the re-connection and the movement distance during the time period from the radio link failure until the re-connection; and
exercising control to start measurement of a reception quality of a second cell, when a reception quality of a first cell has become lower than a preset threshold value, in the control, setting the threshold value for the reception quality to a higher value, based on a measurement instruction from a base station, to allow the measurement of the reception quality of the second cell to be started at an earlier time point.

27. A radio communication system comprising:
one or more cells; and
a mobile terminal, wherein in case a distance between the location where the mobile terminal experienced the radio link failure and the location where the mobile terminal establishes a re-connection to a network is less than or equal to a preset value, a handover between a cell where the radio link failure occurred and a cell where the mobile terminal re-connects to the network is allowed or facilitated, using the information regarding the location where the mobile terminal experienced the radio link failure and the information regarding the location of the re-connection of the mobile terminal to the network.

28. The radio communication system according to claim 27, wherein the mobile terminal reports to a base station the information regarding the location of the radio link failure and the information regarding the location of the re-connection to the network.

29. The radio communication system according to claim 27, wherein in case of a reception quality of a cell becoming lower than a preset threshold value, the reception quality of another cell, as a handover destination, is controlled to be started; the threshold value for the reception quality being set to a higher value to allow the measurement of the reception quality of the another cell to be started at an earlier time point to facilitate the handover.

30. A radio communication system, comprising:
a plurality of cells; and
a mobile terminal, wherein, when, in case a mobile terminal experienced a radio link failure, an elapsed time from the radio link failure until a re-connection of the mobile terminal is less than or equal to a preset threshold value, and a movement distance of the mobile terminal during the time period from the radio link failure until the re-connection of the mobile terminal is less than or equal to a preset threshold value, a handover between a cell of the radio link failure and a cell of re-connection is allowed or facilitated.

31. A method for radio communication, comprising:
checking whether or not a distance between a location where a mobile terminal experienced a radio link failure and a location of a re-connection of the mobile terminal is less than or equal to a preset threshold value, and
in case the distance is less than or equal to the preset value, exercising control to allow or facilitate a handover between a cell where the radio link failure occurred and a cell where the radio link re-connects to a network, using the information regarding the location where the mobile terminal experienced the radio link failure and the information regarding the location of the re-connection of the mobile terminal to the network.

32. The method for radio communication according to claim 31, comprising:
the mobile terminal reporting to a base station the information regarding the location of the radio link failure and the information regarding the location of the re-connection of the mobile terminal to the network.

33. The method for radio communication according to claim 31, comprising:
the mobile terminal exercising control so that when a reception quality of a given cell has become lower than the preset threshold value, a measurement of a reception quality of another cell of the destination of a handover is started,
wherein the threshold value for the reception quality is set to a higher value to allow the measurement of the reception quality of the another cell to be started at an earlier time point to facilitate the handover.

34. A method for radio communication, comprising:
a mobile terminal experiencing a radio link failure;
the mobile terminal comparing, an elapsed time from the radio link failure until a re-connection thereof with a first threshold value and comparing a movement distance of the mobile terminal during the time period from the radio link failure until the re-connection of the mobile terminal with a second threshold value; and
when the elapsed time is less than or equal to the first threshold value and the movement distance is less than or equal to the second threshold value, control being exercised to allow or facilitate a handover between a cell where the radio link failure occurred and a cell of the re-connection of the mobile terminal.

35. A radio communication system comprising:
one or more cells; and
a mobile terminal that, in case of experiencing a radio link failure and then establishing a re-connection, performs at least one of
(A) reporting, in case at least one of a relation that an elapsed time from the radio link failure until the re-connection is less than or equal to a predetermined preset time length and a relation that a movement distance of the mobile terminal during the time period from the radio link failure until the re-connection is less than or equal to a predetermined preset distance value, holds, cell information of at least one of a cell where the radio link failure occurred and a cell where the mobile terminal establishes the re-connection; and
(B) reporting to the base station, at least one of the elapsed time from the radio link failure until the re-connection and the movement distance during the time period from the radio link failure until the re-connection,
wherein whether or not a handover is to be allowed or facilitated between the cell where the mobile terminal experienced the radio link failure and the cell where the mobile terminal establishes the re-connection is determined based on the report.

* * * * *

UNITED STATES PATENT AND TRADEMARK OFFICE
CERTIFICATE OF CORRECTION

PATENT NO. : 8,565,753 B2  Page 1 of 1
APPLICATION NO. : 12/741157
DATED : October 22, 2013
INVENTOR(S) : Hamabe et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 190 days.

Signed and Sealed this

Fifteenth Day of September, 2015

Michelle K. Lee
*Director of the United States Patent and Trademark Office*